(12) United States Patent
Witchey et al.

(10) Patent No.:  US 12,586,328 B2
(45) Date of Patent:      Mar. 24, 2026

(54) LOCATION-BASED DIGITAL TOKEN MANAGEMENT SYSTEMS, METHODS, AND APPARATUS

(71) Applicant: Nant Holdings IP, LLC, Culver City, CA (US)

(72) Inventors: Nicholas J. Witchey, Laguna Hills, CA (US); John Wiacek, Los Angeles, CA (US); Jake Fyfe, Los Angeles, CA (US); Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 19/331,210

(22) Filed: Sep. 17, 2025

(65) Prior Publication Data

US 2026/0017900 A1     Jan. 15, 2026

Related U.S. Application Data

(63) Continuation of application No. 19/210,974, filed on May 16, 2025, now Pat. No. 12,444,150, which is a
(Continued)

(51) Int. Cl.
G06T 19/00          (2011.01)
G06Q 20/36          (2012.01)
(Continued)

(52) U.S. Cl.
CPC ...........  G06T 19/006 (2013.01); G06Q 20/36 (2013.01); G06Q 20/3825 (2013.01); G06T 19/003 (2013.01); H04L 67/131 (2022.05)

(58) Field of Classification Search
USPC .......................................... 345/419–427, 633
See application file for complete search history.

(56) References Cited

U.S. PATENT DOCUMENTS

2018/0198617 A1*   7/2018   Drouin .................. H04L 9/3213
2021/0051141 A1*   2/2021   Duriseati ............ H04L 63/0884
(Continued)

OTHER PUBLICATIONS

U.S. Appl. No. 19/210,974, "Corrected Notice of Allowability," dated Sep. 23, 2025, 2 pages.

*Primary Examiner* — Michael J Cobb
(74) *Attorney, Agent, or Firm* — Kilpatrick Townsend & Stockton LLP

(57)          ABSTRACT

Techniques include storing state information of a set of virtual container units (VCUs), associated digital tokens and current states. The techniques further include presenting an augmented reality (AR) virtual object dispenser in an AR session containing at least a subset of the set of VCUs. In response to receiving a user interaction, the techniques further include updating the state information of a VCU to a second state and recording the updated state information on a ledger. The techniques further include associating the VCU with a user account, wherein at least one digital token associated with the VCU remains unrevealed. The techniques further include enabling a transaction involving the VCU in the second state prior to revealing the at least one digital token. The techniques further include maintaining provenance information of the VCU on the ledger, the provenance information including the current state and at least a portion of transaction history.

20 Claims, 10 Drawing Sheets

Related U.S. Application Data continuation of application No. 18/414,101, filed on Jan. 16, 2024, now Pat. No. 12,333,664, which is a continuation of application No. 18/367,924, filed on Sep. 13, 2023, now Pat. No. 11,928,785, which is a continuation of application No. 18/077,042, filed on Dec. 7, 2022, now Pat. No. 11,798,244.

(51) Int. Cl.
*G06Q 20/38* (2012.01)
*H04L 67/131* (2022.01)

(56) References Cited

U.S. PATENT DOCUMENTS

| | | | |
|---|---|---|---|
| 2021/0279695 A1* | 9/2021 | Rice | G06Q 20/12 |
| 2022/0305378 A1* | 9/2022 | Ward | A63F 13/235 |
| 2023/0289899 A1* | 9/2023 | Lim | G06F 3/04817 |

* cited by examiner

Operator service 211

Operator account 212

User service 213

User account 214

Virtual object container information 215

Virtual object information 216

Transaction service 217

Operator device 220

Computer system 210

Transaction system 240

User device 230

510

520 state
change
501

512 token          530 state
change
502

514 token          530 state
change
503

516

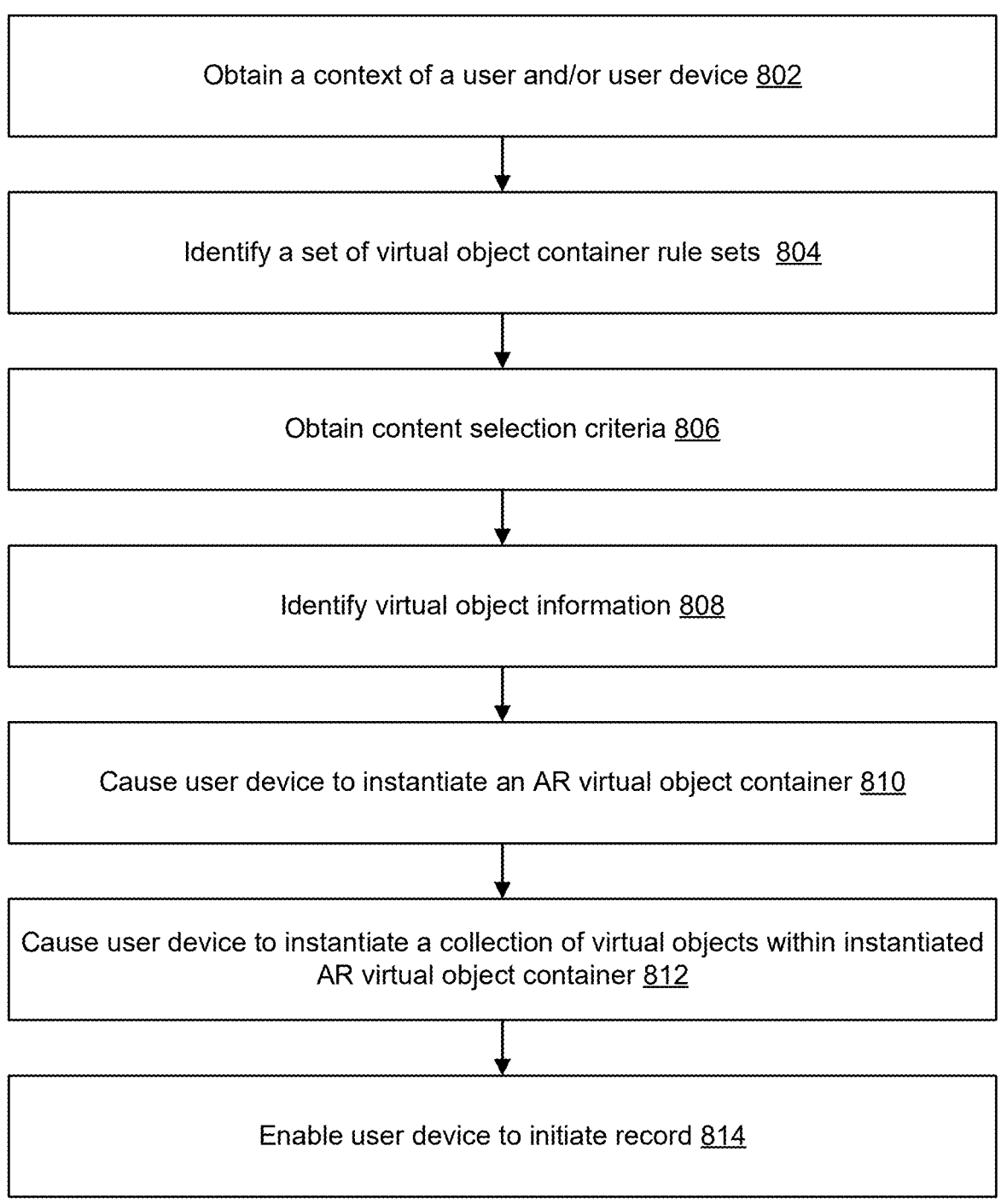

Obtain a context of a user and/or user device 802

Identify a set of virtual object container rule sets 804

Obtain content selection criteria 806

Identify virtual object information 808

Cause user device to instantiate an AR virtual object container 810

Cause user device to instantiate a collection of virtual objects within instantiated AR virtual object container 812

Enable user device to initiate record 814

Figure 8

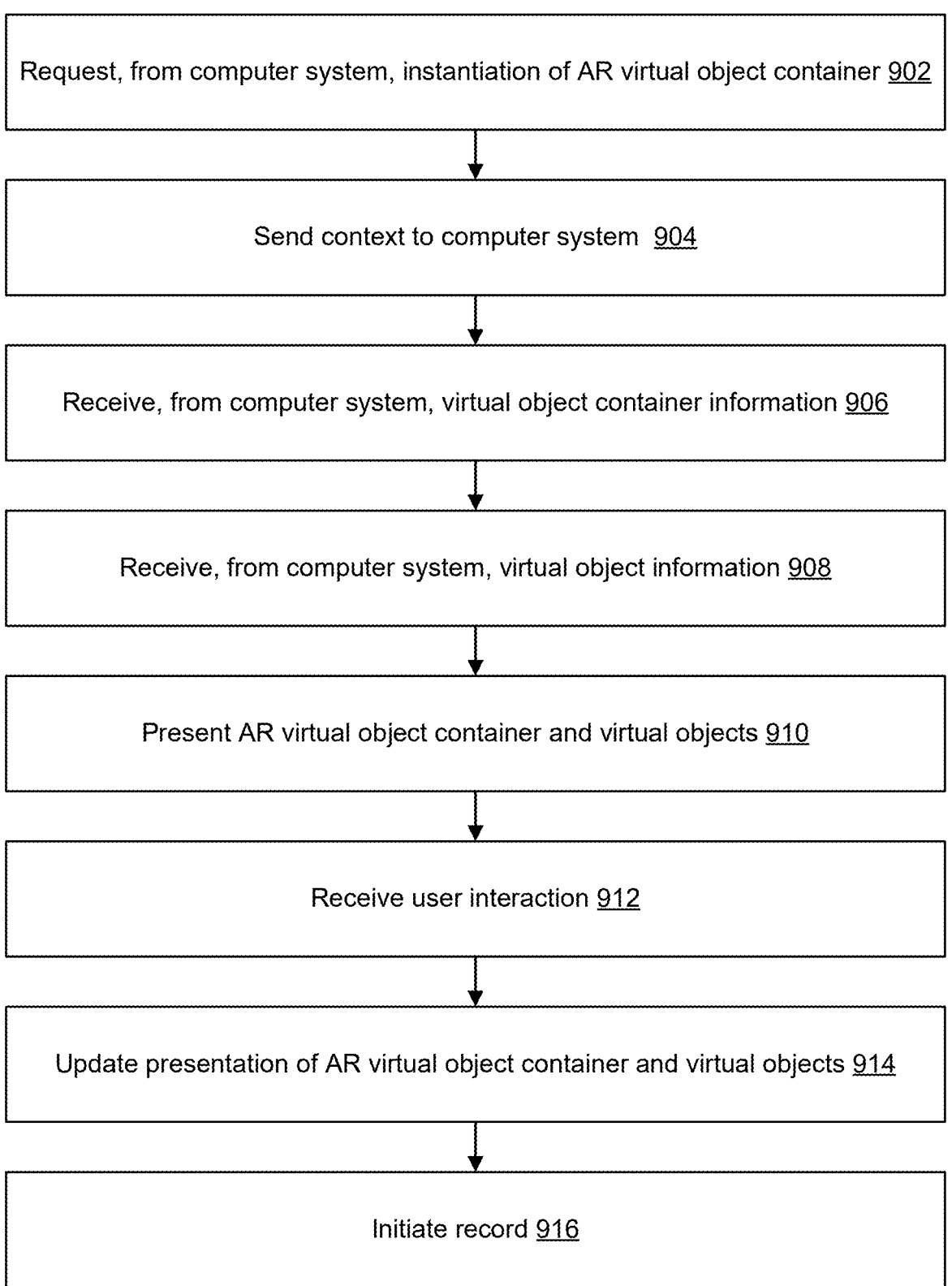

Request, from computer system, instantiation of AR virtual object container 902

Send context to computer system 904

Receive, from computer system, virtual object container information 906

Receive, from computer system, virtual object information 908

Present AR virtual object container and virtual objects 910

Receive user interaction 912

Update presentation of AR virtual object container and virtual objects 914

Initiate record 916

Figure 9

LOCATION-BASED DIGITAL TOKEN MANAGEMENT SYSTEMS, METHODS, AND APPARATUS

CROSS-REFERENCE TO RELATED APPLICATION

This application is a continuation application of U.S. application Ser. No. 19/210,974, filed May 16, 2025, which is a continuation application of U.S. application Ser. No. 18/414,101, filed Jan. 16, 2024, which is a continuation application of U.S. application Ser. No. 18/367,924, filed Sep. 13, 2023, now U.S. Pat. No. 11,928,785, which is a continuation application of U.S. application Ser. No. 18/077, 042, filed Dec. 7, 2022, now U.S. Pat. No. 11,798,244, and entitled "Location-Based Digital Token Management Systems, Methods, And Apparatus," the contents of which are herein incorporated by reference in their entirety for all purposes.

FIELD OF THE INVENTION

The field of the invention generally relates to efficient computer-based augmented reality (AR) interactions with virtual object containers and associated technology.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

Digital tokens can be used for different computer and network-based services. For instance, a non-fungible token (NFT) is an example of a digital token that can include data recorded in or on a blockchain. Given the non-fungible aspect of this particular type of digital tokens and the blockchain or corresponding notarized ledger implementation, the NFT can be a unique digital asset within a computer network environment, a corresponding metaverse, or even globally unique.

Different technologies exist for obtaining a digital token, including an NFT. For example, a user may operate a user device executing a web browser to access an online web service and may use a user account to obtain a digital token via the online web service. However, existing technologies are limited vis-à-vis augmented reality environments for interacting with digital token services.

All publications identified herein are incorporated by reference in entirety to the same extent as if each individual publication or patent application were specifically and individually indicated to be incorporated by reference. In some instances, publications are identified, but no statement of incorporation is provided for brevity and clarity. Still, such publications are also incorporated by reference in their entirety. Where a definition or use of a term in an incorporated reference is inconsistent or contrary to the definition of that term provided herein, the definition of that term provided herein applies and the definition of that term in the reference does not apply.

In some embodiments, the numbers expressing quantities or units of, for example, data used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be understood that many of the foundational technical features provided in the following specification are presented to enable compact examination of the disclosed inventive subject matter. While some of the foundational technical features described herein may seem obscure, in many cases such features may be considered within the scope of understanding of one skilled in the art. Thus, presentation of such background technologies should not be considered limiting.

SUMMARY

The inventive subject matter provides apparatus, systems and methods for using virtual object containers to provide, in an augmented reality (AR) environment, virtual objects. A virtual object container can have corresponding virtual object container information stored in a database. The virtual object container information can include, among other things, a physical location and a rule set associated with the use of the virtual object container. A collection of virtual objects can also have virtual object information stored in the same database or a different database. Each virtual object can be associated with or correspond to one or more digital tokens (e.g., NFTs, collectible digital tokens, ledger tokens, etc.). A user device having a location corresponding to the physical location (e.g., within a distance threshold, user context, S2 cells, geo-fence, zip code, etc.) can present the virtual object container in an AR session. Based on the rule set and one or more selection criteria, the virtual object container can be associated with the collection of virtual objects. As such, in the AR session, and depending on the rule set, a particular user interaction (e.g., an interaction with the virtual object container, a transaction, a purchase, a trade, an instantiation, a minting, etc.) can cause one or more of the virtual objects to be presented and/or associated with a user account.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 8 illustrates an example of a flow for associating a token with a user account, according to embodiments of the present disclosure.

FIG. 9 illustrates another example of a flow for associating a token with a user account, according to embodiments of the present disclosure.

DETAILED DESCRIPTION

Figure 1:
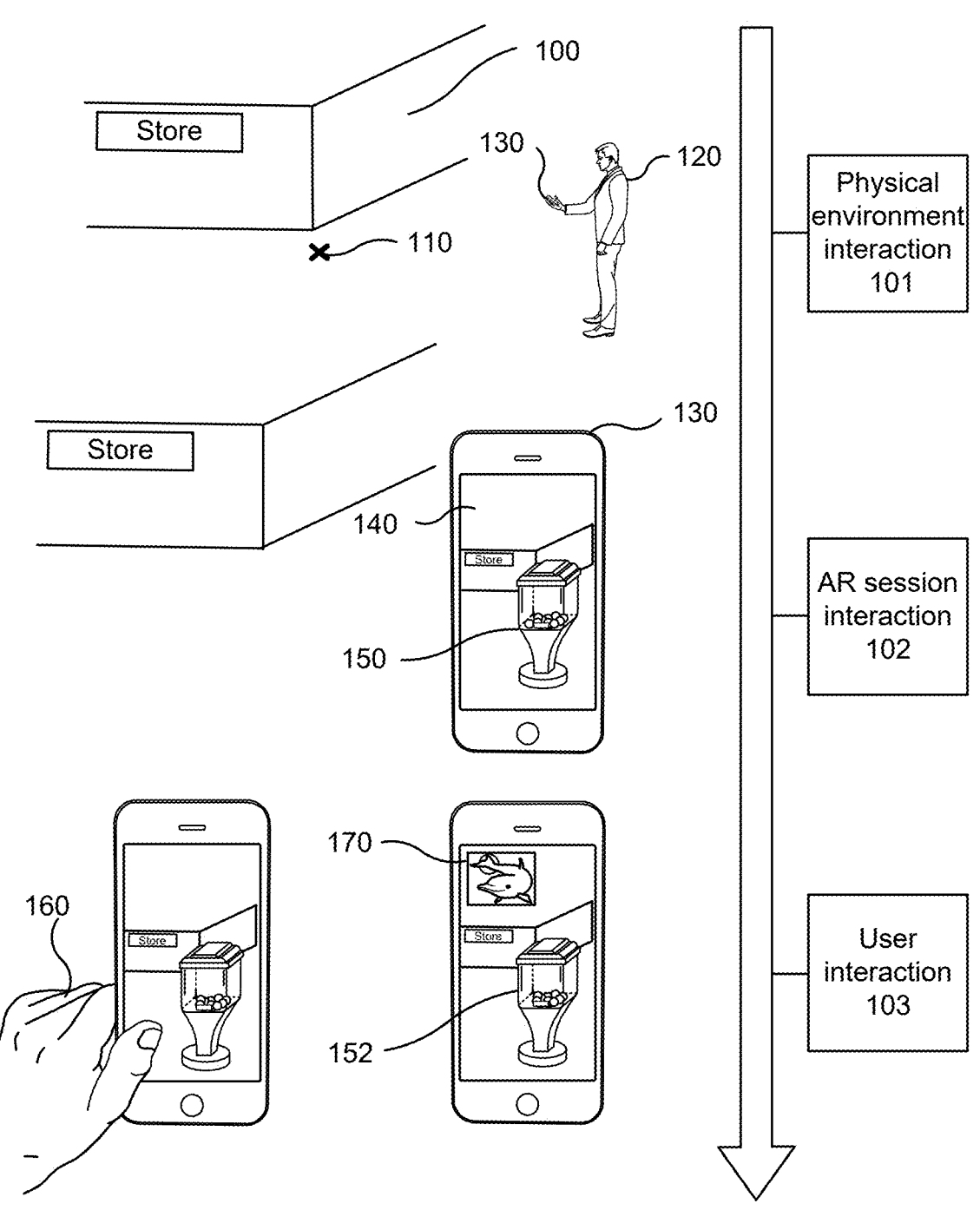
FIG. 1 illustrates an example of an augmented reality environment for a location-based virtual object container and related interactions, according to embodiments of the present disclosure.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise at least one processor configured to execute software instructions stored on a tangible, non-transitory computer readable storage medium (e.g., hard drive, FPGA, PLA, solid state drive, RAM, flash, ROM, etc.). The software instructions or suite of software instruction configure or program the computing device or their processors to provide the roles, responsibilities, or other functionality as discussed below with respect to the disclosed apparatus or systems. Further, the disclosed technologies can be embodied as a computer program product that includes a non-transitory computer readable medium storing the software instructions or a suite of software instructions that cause one or more processors to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, TCP, UDP, FTP, SNMP, IP, AES, public-private key exchanges, web service or RESTful APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network, wired or wireless.

As used in the description herein and throughout the claims that follow, when a system, engine, server, agent, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory. It should be appreciated that the combination of software and hardware working in concert create a dedicated set of physical, real-world structures that provide utility to one or more users that would not exist outside the scope of the physical, real-world assets.

One should appreciate that the disclosed techniques provide many advantageous technical effects including presenting a virtual object container in an augmented reality (AR) environment and enabling interactions therewith to obtain virtual objects and record related information. This is achieved by the use of the disclosed data structures and computing devices forming a client-server computing system architecture that may operate over one or more networks.

The focus of the disclosed inventive subject matter is to enable construction or configuration of a computing system to operate on vast quantities of digital data, beyond the capabilities of a human. The digital data described herein represent various real-world and virtual world elements. By instantiating the corresponding relevant data structures, virtual object containers, virtual objects, and/or other digital constructs in one or more memories of the computing system, the computing system can manage the digital data or models in a manner that provides improves performance of computing devices and thereby provides utility to a user of a computing device that the user would lack without such a tool.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Various embodiments of this disclosure are described herein. Variations of those embodiments may become apparent to a person having skill in in the art upon reading the foregoing description. Accordingly, this disclosure includes all modifications and equivalents of the subject matter recited in the claims appended hereto.

Furthermore, all references cited herein are hereby incorporated by reference to the same extent as if each reference were individually and specifically indicated to be incorporated by reference and were set forth in its entirety herein.

In various embodiments disclosed herein, a digital token can be implemented to represent or otherwise protect an asset, real or virtual. In some embodiments, the asset can represent digital data, such as an image, a graphic, an audio file, a video file, a trademark, a copyright work, an access control (e.g., a digital ticket to access a reserved and/or secured area, a bearer token, a key, a digital signature, a digital certificate, etc.), a program code, a program code package (e.g., a program code update, a video game character, a video game skin, a texture for a video game skin, a patch on a video game character's outfit, a video game object, etc.), a personal record (e.g., a proof of a visit to a location, a proof of a meeting with a particular character, etc.), etc. The digital token can be provided to a user (e.g., recorded as being associated with a user account of the user, transfer to a user's digital wallet, presented for interaction, etc.) based on different contexts including, for example, a context that depends on location of the user or the user's corresponding computing device.

A virtual object can be associated with the digital token. For example, the virtual object can be the digital token itself, the virtual object can include information for creating and/or obtaining the digital token from a source, or a can even comprise a virtual container that includes the digital token or the associated information. The virtual object can include a mixed reality object, such as a virtual reality (VR) object, an augmented reality (AR) object, or a mixed-physical reality object where a physical object provides a basis or foundation for augmented reality experiences. An AR virtual object container can be associated with one or more collections of virtual objects (e.g., a group, an inventory, parts, etc.) and can be presented and interacted with in an AR session possibly based on different contexts and rule sets. An interaction with the AR virtual object container can result in a digital token being provided to a user, for example, by assigning the digital token to the user.

In an example, an AR virtual object container can be generated based on a set of attributes related to a mobile computing device and possibly a user, a physical location for example. In this example, information related to the AR virtual object container can be managed separately from the information related to virtual objects. Said differently, the AR virtual object container can be a distinct manageable object from the virtual objects. Thus, the virtual objects are not required to be part of the AR virtual object container. Still, in some embodiments, the virtual objects or their behaviors can be influenced via one or more rule sets defined in the virtual object container information. For example, the rule sets can indicate the type and number of virtual objects that can be shown as being contained in the AR virtual object container in an AR session of a user device. The rule sets can also indicate types of interactions, contexts (e.g., user contexts, device contexts, etc.) and/or conditions (e.g., locations, proximities, sequence of events, times, weather, etc.) to interact with the AR virtual object container in the AR session such that one or more of the virtual objects can be removed from the AR virtual object container and associated instead with a user account.

In the interest of clarity of explanation, embodiments of the present disclosure are described by using the example of a virtual token machine that provides NFTs in a deterministic manner in an AR session, such as a virtual vending machine or a virtual dispensing machine implemented in an AR environment. However, the embodiments are not limited as such and similarly apply to any type of AR virtual object containers, digital tokens, and/or computing sessions. For example, the AR virtual object container can be presented as a virtual machine that provides a digital token in a random manner (e.g., a virtual spin the wheel machine, a virtual game of chance machine, via a pseudorandom number generator, etc.) or a merit-based manner (e.g., upon achieving a predefined goal, upon reaching a level, etc.) and that can be presented in a video game session.

FIG. 1 illustrates an example of an AR environment for a location-based virtual object container and related interactions, according to embodiments of the present disclosure. As illustrated, a physical structure 100 (e.g., a store, a building, a venue, a billboard, a sign, a statue, a piece of art, a park bench, etc.) can be visited by a user 120 operating a user device 130. A physical location 110 outside the physical structure 100 (alternatively, inside the physical structure 100 or on a wall, surface, or other physical object of the physical structure 100) can be associated with a virtual token machine 150. For example, the physical location 110 or portions thereof can be an anchor point for presenting the virtual token machine 150. Based a physical environment interaction 101 and based on an execution of an application on the user device 130, typically a smart phone in this example, a graphical user interface (GUI) 140 of an AR session can be presented on the user device 130 and can show the virtual token machine 150 as being anchored at the physical location 110 where the virtual token machine 150 remains fixed to and superimposed on the environment even as the field of view of the user device 130 changes. Subsequently, an AR session interaction 102 can occur, whereby the presentation of the virtual token machine 150 can change. Upon a user interaction 103 with the virtual token machine 150, information 170 indicating an NFT and an update 152 to the presentation of the virtual token machine 150 can be shown to the user 120 to indicate that the NFT has been dispensed from the virtual token machine 150 and associated with a user account of the user 120. Example techniques for anchoring AR content that may be adapted for use include those described in U.S. Pat. No. 10,733,808 to Dzhurinskiy et al. titled "Chroma Key Content Management Systems and Methods," filed Feb. 27, 2019, which is incorporated herein by reference in its entirety.

The user device 130 can be any suitable computing device having one or more processors and one or more memories storing program code, such as computer-readable instructions, that upon execution by the one or more processors configure the user device 130 to perform operations as described in the present disclosure. For example, the user device 130 can be any of a smartphone, a cellphone, a phablet, a tablet, a wearable device such as smart glasses, a smart watch, a game console or device, an appliance, a robot, a vehicle, or any other type of mobile devices. The user device 130 can be operated as a standalone device or can be integrated in other devices. For example, the user device 130 can be installed in a vehicle, in a remote controlled device, in an autonomously operated device, etc.

The virtual token machine 150 can be an AR virtual object container that provides container units in an AR session, possibly in a deterministic manner. For example, the virtual token machine 150 can be AR dispensing machine, an AR vending machine, an AR gashapon machine, an AR automatic teller machine, an AR newspaper machine, an AR game machine, an AR ticketing machine, an AR educational machine, an AR souvenir machine, an AR collectible machine, AR arcade machine, AR pinball machine, AR claw machine, etc. Further, virtual token machine 150 can take on different forms and does not necessarily have to be modeled as a machine per se. For example, virtual token machine 150 could be an animated character (e.g., cartoon character, an automobile, mascot, spokesperson, an alien, a monster, a game character, etc.) that hands or otherwise provides the corresponding token to a user in the AR session. Consider a case where the technology is deployed at Yellowstone National Park. In addition to deploying AR vending machines about the park, custom AR vending experiences may be anchored as specific features; Old Faithful for example, where the vending experience is an AR geyser that erupts, and the erupting water presents the token to the user. Thus, implementation of the virtual token machine 150 can be quite varied across a broad spectrum of possible presentation techniques and across a broad spectrum of modalities (e.g., AR video, AR images, AR sound or audio, AR kinesthetics, AR haptics, etc.), which may be used for visually impaired persons or otherwise handicapped persons.

The physical environment interaction 101 can relate to a proximity of the user device 130 to the physical location 110. Different proximity detection techniques are possible. In an example, location-based proximities are used. In particular, a location of the user device 130 can be determined using one or more device locating technologies and compared to the physical location 110 to determine a relative distance. Likewise, a relative direction, a relative orientation, and/or a relative position (which can be a combination of the relative location and relative orientation) can be determined when the physical location 110 has a known position that can be used as an origin in a multi-dimensional coordinate system. If the relative distance is within a threshold distance, if the relative direction is within a threshold direction, if the relative orientation is within a threshold orientation, and/or if the relative position is within a threshold position, or otherwise satisfies distance criteria, the user device 130 is determined to be proximate to the physical location 110, thereby triggering the presentation of the virtual token machine 150 in the AR session. The thresholds or distance can correspond to a geo-fence that can be defined relative to the physical location 110 and that can have values set depending on one or more contexts (e.g., depending on user preferences, user account subscriptions, types of user devices, etc.). Suitable technologies include satellite-based positioning (such as GPS coordinates), cellular network triangulation techniques, S2 cells techniques whereby the physical location 110 and the user device's 130 location are translated into two-dimensional geographic units and compared, device-based sensor data (including data generated by accelerometers, gyroscopes, and/or other device sensors), etc. The proximity detection can also be at different granularity levels including absolute locations, proximate locations, zip codes, Google plus-codes, physical addresses, geocodes, network addresses (e.g., IP addresses, URLs, detection of data connectivity to a wireless access point at the physical location 110 or inside the physical structure 100), etc.

Non-location based proximity techniques are also possible. For example, a barcode or a QR code installed at the physical location 110 can be scanned by the user device 130 to trigger the presentation of the virtual token machine 150 in the AR session. Additionally, or alternatively, a predefined physical object can be located at the physical location 110 (e.g., a store mascot, a theme park character, a logo sign, etc.). Image data generated by the user device 130 can be processed by using an object detection algorithm. Upon detection of the physical object from the image data, the presentation of the virtual token machine 150 is triggered. Further, image data can be generated by a camera at or nearby the physical location 110. The image data can be processed to detect the user device 130 and/or to perform a juxtaposition procedure that compares the camera's image data and the user device's 130 image data and determine a set of features common to both sets of images. The common features can indicate proximity. Implementations of computer vision algorithms that may be used to recognize objects or process images in support of the AR experiences includes those offered by OpenCV (see URL opencv.org). Still further, a juxtaposition among multiple objects in a digital representation of a scene captured by user device 130 may be used to unlock or gain access to virtual token machine 150. Example techniques for leveraging a juxtaposition among objects that may be adapted for use with the inventive subject matter are described in U.S. Pat. No. 11,503,007 to Soon-Shiong titled "Content Activation via Interaction-Based Authentication Systems and Methods," filed on Oct. 15, 2020, which is incorporated herein by reference in its entirety.

The AR session interaction 102 can include operations that may change how the virtual token machine 150 is shown in the GUI 140. Such operations can include panning, zooming, angling, changing a view perspective, etc. depending on the proximity (distance and/or direction) between the user device 130 and the physical location 110 and/or orientation of the user device 130 (which can be determined from one or more sensors of the user device, such as an accelerometer, a gyroscope, etc.). For example, virtual token machine 150 may be anchored to a physical location, a surface, or an object. As a person moves about the environment, virtual token machine 150 as rendered on a display of user device 130 may change dimensions to remain in proper scale with the surrounding real-world objects while remaining anchored. For example, virtual token machine 150 may be anchored to a store logo or proximate to a store logo (e.g., TARGET's target, NIKE swoosh, etc.).

The user interaction 103 can be user input 160 at the GUI 140, such as a tap, a double tap, a swipe up, a swipe down, a tap on menu items, an interaction with widgets of GUI 140, a shake, a tilt, a rotation, or any other type of GUI-based user input. Non-GUI based user interactions are possible including, for example, natural language speech input that can be processed locally at the user device 130, remotely at a server (not shown), or distributed between the user device 130 and the server, to determine an interaction with the virtual token machine 150.

Prior to the user interaction 103, the virtual token machine 150 is shown to include a particular number of container units. Each container unit can be shown as a virtual wrapper (e.g., a ball, a box, a bag, an action figure, etc.) that contains an NFT. The update 152 is shown after the user interaction 103 and indicates that the NFT has been dispensed from the virtual token machine 150. For example, the update 152 shows that the particular number of container units has decreased. The container units along with their corresponding digital tokens (e.g., NFTs, etc.) in this example may represents an inventory of virtual token machine 150.

The information 170 can be presented to show that one of the container units has been dispensed, such as being shown a ball being dispensed out of the virtual token machine 150. This unit may be further interacted with in the AR session (e.g., via the GUI 140 and/or based on natural language speech) to remove the unit and reveal the NFT. As illustrated in FIG. 1, the NFT 170 corresponds to an image and this image is shown in the GUI 140.

Figure 2:
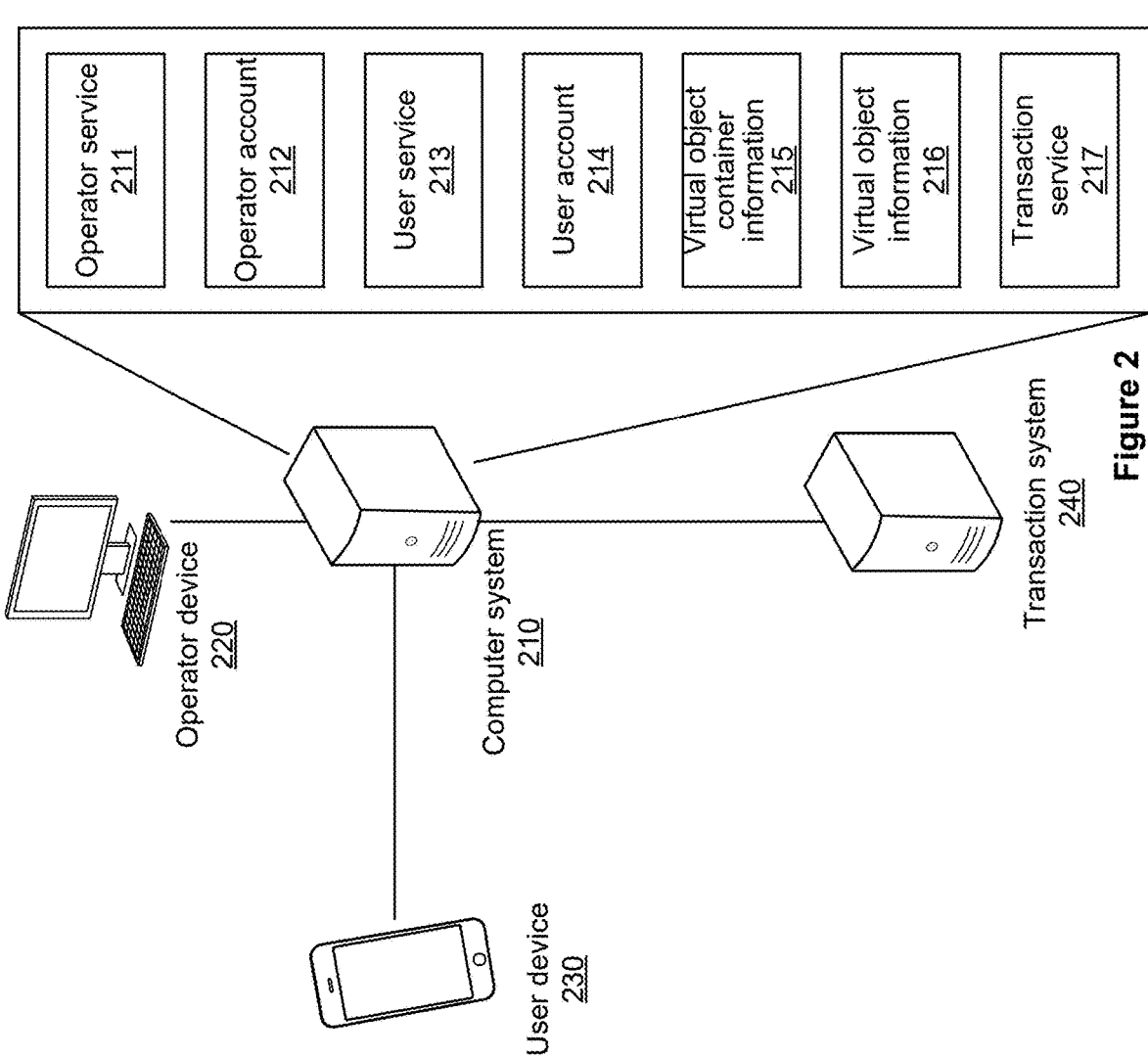
FIG. 2 illustrates an example of a computer-based digital content delivery management that enables a location-based virtual object container and related interactions, according to embodiments of the present disclosure.

FIG. 2 illustrates an example of a computer-based digital content delivery management that enables a location-based virtual object container and related interactions, according to embodiments of the present disclosure. Among other things, the computer-based digital content delivery management includes a computer system 210 communicatively coupled over one or more data networks (not shown; wired, wireless, cellular, mesh, etc.) with an operator device 220, a user device 230, and a transaction system 240. The computer system 210 can provide an operator service 211 to the operator device 220 and a user service 213 to the user device 230. Such services 211 and 213 can relate, at least in part, to a transaction service 217 associated with the transaction system 240.

In an example, the computer system 210 is operated by a service provider that provides computer-based digital virtual token machine and NFT services. An operator of the operator device 220 can have an operator account 212 registered with the service provider. The operator may desire to use the virtual token machine and NFT services. In particular, the operator may want one or more virtual token machines to be available at one or more physical locations for dispensing one or more types of NFTs. An operator login to the operator account 212 may be received via an application executing on the operator device 220, where this application may interface with the operator service 211 via a web interface and/or an application programming interface (API). In some embodiments, the operator account 212 may be based on a digital wallet (e.g., METAMASK, etc.), social media account (e.g., FACEBOOK, TWITTER, INSTAGRAM, etc.), an email account (e.g., YAHOO! Email, GOOGLE gmail, etc.), or based on other types of user identifier information.

Upon a successful login, the operator can specify information related the physical locations, the types of virtual token machines, the types of NFTs (and, optionally, the specific NFTs), parameters that define the presentation formats (e.g., look, feel, sound, modalities, etc.) of the virtual token machines and/or container units, the number of container units per virtual token machine, triggers for presenting virtual token machines (e.g., proximity, object detection, etc.), type of interactions with the virtual token machines (e.g., swipes, taps, natural language speech input, tilts, shakes, etc.), animations related to the interactions, rules for using the virtual token machines (e.g., charge amount per interaction, series of events that need to be performed to enable an interaction, coordinated behavior among virtual token machines, etc.), etc. Such information can be received by the operator service 211 and stored as part of virtual object container information 215 and/or virtual object information 216 as further described herein below. In addition, the operator service 211 can enable updates to the operator account 212, where such updates can be retrieved and presented at the operator device 220. For example, the updates can relate to a balance of the operator, the number of dispensed units, the type of dispensed NFTs, details about the NFTs including the number of dispensed NFTs, revenues and costs, history of use per virtual token machine, number of views per virtual token machine, statistics, metrics, and/or histograms about the uses and/or views, etc. Such information may be rendered for display via a dashboard presented to the user of the operator account 212, possibly via a web site interface or through interaction of a remote procedure call (e.g., RESTful API, API, etc.).

In an example, a user of the user device 230 can have a user account 214 registered with the service provider. The user may desire to use the virtual token machine and NFT services. In particular, the user may want to interact with one or more virtual token machines to obtain one or more NFTs. A user login to the user account 214 may be received via an application executing on the user device 230, where this application may interface with the user service 213 via a web interface and/or an API.

In an example, the user account 214 includes or corresponds to a digital wallet, such as a cryptographic wallet (e.g., MetaMask, CoinBase, Trezor, Ledger, Exodus, BitGo, UberPay, Jaxx, CryptX, ZenGo, SimpleHold, Trust, NGrave, BitBox, KeepKey, Keevo, SecuX STONE, etc.), a software wallet, a hardware wallet (e.g., a device from LEDGR, TREZOR, etc.), a healthcare wallet, an exchange wallet, or any other type of digital wallet including a proprietary wallet dedicated to the virtual token machine ecosystem. Generally, the digital wallet can be associated with a set of cryptographic keys (e.g., a private key and a public key, referred to also as a private address and a public address, etc.) that secure information and facilitate access thereto. The user device 230 can encrypt information about an asset to protect with one of the cryptographic keys, whereas the computer system 210 can perform decryption using the other key (e.g., the private key, etc.).

The user service 213 can determine one or more contexts of the user and/or user device 230. A user context can be, for example, a user preference, a user setting, etc. available from the user account 214. A device context can be, for example, a location of the user device 230, a connection of the user device 230 to a data network access point, a proximity of the user device 230 to a physical location, an object detected to be within a field of view (FOV) of a camera of the user device 230 and corresponding to a physical location, a type of the user device 230, an operating system of the user device 230, a type of the application executing on the user device 230, a game context (when the application or another application executing on the user device 230 is a gaming application), a healthcare context (when the user device 230 is operated to access a healthcare service or is near a location of a healthcare service provider), a sports context (when the user device 230 is operated to access a sports service or near a location of an online sports venue), an entertainment context (when the user device 230 is operated to access an online entertainment service or is near a location of an entertainment venue), an education context (when the user device 230 is operated to access an online education service or is near a location of an education facility), a shopping context (when the user device 230 is operated to access an online shopping service or is near a location of a shopping store or center), etc. Other types of contexts are possible and can relate to the physical or AR environment including, for example, a virtual token machine context (such as any attributes of this machine), a planogram context (such as an arrangement of products in a store nearby the user device 230), etc. In various embodiments, a context can be represented by one or more identifiers and/or characterized by one or more data structures that outline the attributes or parameters defining the context. For example, a context may have a name, say "Education" where the parameters define the requirements for the education context to be valid or otherwise active. When attributes associated with the user (e.g., location, time, demographics, device information, etc.) satisfies the education context criteria, then the context may be considered valid.

Based on one or more of the contexts and the virtual object container information 215 and the virtual object information 216, the user service 213 can send information to be presented by the application. The presentation can occur in an AR session that the application can provide. Different types of information are possible depending on the implementation of the application and the user service 213. In some embodiments, the user device may be provisioned with digital graphics to reduce use of bandwidth when loading a new virtual object. In other embodiments, the digital graphics may be downloaded in real-time as the contexts become valid or activated. Conversely, when the contexts are no-longer valid or become deactivated, the context-relevant virtual object information may be removed from memory to optimize performance of the user device.

In one example implementation, the user service 213 causes the application to instantiate a virtual token machine in the AR session by sending program code corresponding to the virtual token machine to the user device 230. In this example, the application can retrieve, from the virtual object container information 215 and/or virtual object information 216, the relevant information to render the virtual token machine, enable interactions therewith, and associate a dispensed NFT with the user account 214. This information can include an identifier of the virtual token machine, a presentation template for the presentation of the virtual token machine, a count and identifiers of the virtual wrappers, a rule template for the presentation of the virtual wrappers, identifiers of the NFTs, types of allowed user interactions, animation templates, etc. In this case, upon a virtual wrapper being dispensed, an identifier of this virtual wrapper can be sent to the user service 213 that, in turn, updates the virtual object information 216 to decrease the account and indicate a state of the virtual wrapper having the identifier. The state can be set to dispensed. Upon the virtual wrapper being opened, the application can also send an update indicating this change to the user service 213 that, in turn, changes the state to open (or some other state indicator). Upon the opening of the virtual wrapper, the application can determine an identifier of the NFT and retrieve from a source (e.g., from the computer system 210 or the transaction system 240) metadata about the NFT, such as information about an asset that the NFT protects (e.g., an image, a video file, etc.). This information can be presented by the application. In addition, the application can indicate to the user service 213 that the NFT has been obtained. In turn, the user service 213 updates the virtual object information 216 to indicate this NFT state. The application can also invoke the transaction service 217 to associate the NFT with the user account 214. This NFT service 217 can then make a call (e.g., a web call or an API call) to the transaction system 240 to record an update to the ownership of the NFT (e.g., by adding a block to a blockchain associated with the NFT, where this block included information from the user account 214, such as a user account identifier 214) and include auditable information to validate the ownership. Alternatively, the application can make the call directly to the transaction system 240 without needing to interface with the transaction service 217.

In the above example, the NFT is presumed to have already been created (e.g., minted) prior to the dispensing of the virtual wrapper. However, the embodiments may not be limited as such. In particular, the virtual wrapper can include information for creating the NFT. Upon opening the virtual wrapper, the application can determine the information and execute the relevant process to create the NFT. The transaction system 240 (which can be interacted with directly or indirectly) can record information about the NFT creation and ownership. Example techniques for creating an NFT are described in U.S. patent application Ser. No. 17/971,244, "Efficient Computer-Based Indexing Via Digital Tokens, Systems, Methods, And Apparatus," filed Oct. 21, 2022, which is incorporated herein by reference in its entirety.

In another example implementation, the user service 213 instantiates the virtual token machine and causes the application to present it in the AR session by sending a presentation command and relevant presentation information to the user device 230. In other words, rather than the application handling the execution of the virtual token machine at runtime, the user service 213 does so and the application is configured as a client interface to the user service 213. Here, the user service 213 handles the rendering of the virtual token machine, virtual wrappers, NFTs, the animations, the updates to the virtual object information 216 and the user account 214, the recording of the transaction (e.g., updating of ownership record), the creation of NFTs that are dispensed, etc. Such an approach is considered advantageous because it provides for optimizing performance of the service or client device as desired.

Of course, a hybrid implementation can be used and can represent a distribution of the processes between the user service 213 and the application executing on the user device 230. For example, the virtual token machine can be instantiated by the user service 213, whereas the application can record the transaction (e.g., directly or indirectly).

The auditable information can be recorded on-ledger and/or off-ledger and is usable to audit the transaction and validate that the NFT was properly obtained. This information can include any of a timestamp of when the NFT was dispensed, the identifier of the virtual wrapper, the identifier of the virtual token machine, the physical location associated with virtual token machine, the user context(s), the device context(s), and/or any other information that can be audited or used to verify the ownership. The auditable information can also indicate that the user device 230 was actually in proximity to the physical location associated with the virtual token machine to prevent or mitigate the risk of hacking, spoofing, or other improper behavior and use of the technology. This indication can be based at least in part on extrinsic device data related to the user device. For example, the extrinsic evidence can include proof of attendance which can include any or a combination of image data generated by a camera located nearby or at the physical location and showing the user device, image data generated by the user device and showing the physical location, a scan by the user device of a QR code or barcode located at the physical location, network data, etc. Network data can relate to the latency over the network communicatively coupling the user device 230 and the computer system 210, a ping time by the computer system 210 to the user device 230, a satellite time (when the network is at least in part satellite-based), a network measurement (e.g., signal strength, beam direction in a 5G network, etc.), an IP address. In an example, historical network data can be collected over time from multiple user devices when such devices are interacting with the computer system 210 in association with the virtual token machine. A statistical measure can be applied to this historical data (e.g., averaging, mean, distribution function, etc.) to determine an acceptable range of network data values (e.g., an acceptable latency range, an acceptable signal strength range, etc.). When the network data of the user device 230 has value(s) in acceptable range(s), the computer system can generate a proof of attendance and can include such value(s) and the acceptable range(s) in the auditable information. The auditable information allows the service to monitor the behavior of the system and make automated changes when update criteria are satisfied. Further, the auditable information allows the stakeholders to understand how their NFT-based campaigns are actually doing in the field.

The user service 213 can also enable the user to view different information from the user account 214. For example, the user service 213 enables viewing a balance available to use for obtaining NFTs, what virtual token machines they have visited, what virtual token machines they have used, what NFTs were dispensed per virtual token machine, states of virtual wrappers (e.g., to view unopened wrappers), etc. Such information, for example, may be used for account purposes, or also for leaderboards or user badges as desired.

In an example, the transaction service 217 enables the recording of a transaction related to the dispensing of an NFT. As explained herein above, the actual recording can be performed by the transaction system 240, whereby the transaction service 217 makes a call thereto and provides it the relevant information to be recorded (e.g., the user account information, the NFT identifier, the user context(s), the device context(s), the virtual token machine identifier, the virtual wrapper identifier, the physical location, the timing of the dispensing, etc.). Transactions related to NFTs may be recorded by one or more corresponding smart contracts operating the corresponding notarized ledger.

The transaction system 240 can record the transaction using different techniques. In one example, on-ledger techniques are used. In particular, the information about the transaction can be stored in a block of a blockchain. In another example, off-ledger techniques are used. In particular, the information about the transaction can be stored in a non-distributed manner (e.g., in an entry of a database, a public or private file system, the InterPlanetary File System (IPFS; see URL ipfs.tech), etc.). In both cases, the information can indicate an ownership transfer of an NFT to the user and permits auditing or verification of this transfer (e.g., by including the user context(s), the device context(s), the virtual token machine identifier, the virtual wrapper identifier, the physical location, the timing of the dispensing, etc.). Although the transaction system 240 is shown as being separate from the computer system 210, the two systems 210 and 240 can be the same. Additionally, or alternatively, the transaction system 240 can correspond to the token management platform (TMP) described in U.S. patent application Ser. No. 17/971,244, "Efficient Computer-Based Indexing Via Digital Tokens, Systems, Methods, And Apparatus," filed Oct. 21, 2022, which is incorporated herein by reference in its entirety.

The computer system 210 can be implemented as specialized hardware forming a set of content servers or software executing on a set of content servers (e.g., as a set of virtualized servers hosted in one or more data centers and providing cloud-based services, etc.). In comparison, each of the user device 230 and operator device 220 can be a suitable computing device that includes one or more processors and one or more memories storing program code, such as computer-readable instructions, that upon execution by the one or more processors configure the computing device to perform the relevant operations as described in the present disclosure. The user device 230 can be an example of the operator device 220.

In an example, the virtual object container information 215 indicates rule sets that manage the use of virtual token machines. A rule set associated with a virtual token machine can include a set of criteria to be met for the use and a set of parameters controlling the actual use. The set of criteria can relate to a physical location, a proximity, an object detection, a user context, a device context, and/or any other conditions or triggers to instantiate the virtual token machine. Such parameters may be represented by attribute-value pairs stored in an instantiated object in memory, for example. The set of parameters can be specified in at least a rule template defining aspects of the process for generating the virtual token machine and/or container units locally at the user device, the computer system, or in a distributed manner between the user device and the computer system. The rule template can also define the presentation formats and styles (e.g., look and feel) of the virtual token machine and/or container units to be shown as contained in the virtual token machine, the number of container units, type of supported interactions with the virtual token machine, animations related to the interactions, rules for using the virtual token machine (e.g., charge amount per interaction, series of events that need to be performed to enable an interaction, etc.), etc. The rule template can include one or more of a markup language template (e.g., XML template, HTML document), a source code, a compiled code, a JavaScript Object Notation (JSON) object, or an A Programming Language (APL) document, a script (e.g., Python, Perl, Ruby, Lua, etc.), a rule object, a rule table, a class definition, or any other template defined in a programming language. Some or all of the set of criteria and/or parameters can be defined based on input of the operator received by the operator service 211.

In comparison, the virtual object information 216 can relate to collections of NFTs. A collection of NFTs can be associated with a virtual token machine by including, in the virtual object information 216, a location association (e.g., this collection applies to a particular physical location) and/or context (e.g., this collection applies to a particular user context(s) and/or device context(s)). Additionally, or alternatively, the virtual object information container 215 can associate the virtual token machine with the collection by including an identifier (e.g., a unique number, a name, a GUID, a UUID, etc.) of the collection and associating this identifier with an identifier of the virtual token machine. Information about the collection can identify the number of virtual dispensing units (e.g., the virtual wrappers), their states (e.g., undispensed, dispensed but unopened, dispensed and opened, etc.), the number of NFTs, the NFT states (e.g., undispensed, dispensed but not revealed, dispensed and revealed), etc. and can include either the NFTs themselves, their network storage addresses (e.g., uniform resource locators (URLs), URI, file name, etc.), and/or information for creating the NFTs (e.g., a virtual dispensing unit can include an NFT identifier and/or such information, and when its state changes to dispensed and opened, the information can be used to create an NFT).

The virtual object container information 215 can be stored in a first database (a container database, for example) and some or all of this information 215 can be managed based on the input of the operator via the operator service 211. In comparison, the virtual object information 216 can be stored in a second database (a virtual object database) and some or all of this information 216 can be managed based on the input of the operator via the operator service 211 and/or input of the user via the user service 213. The two databases can be implemented using off-ledger techniques or, alternatively, on-ledger techniques. The computer system 210 can include the two databases. Further, the first database can include the second database or vice versa.

As such, the virtual object container information 215 can be used to manage an inventory of AR virtual object containers, such as inventory of virtual token machines. In comparison, virtual object information 216 can be used to manage, for each AR virtual object container, an inventory of virtual objects, such as an inventory of container units. The two sets of information 215 and 216 can be maintained separately (such as in different databases). One AR virtual object container can service multiple virtual object inventories based on one or more contexts, including locations.

Figure 3:
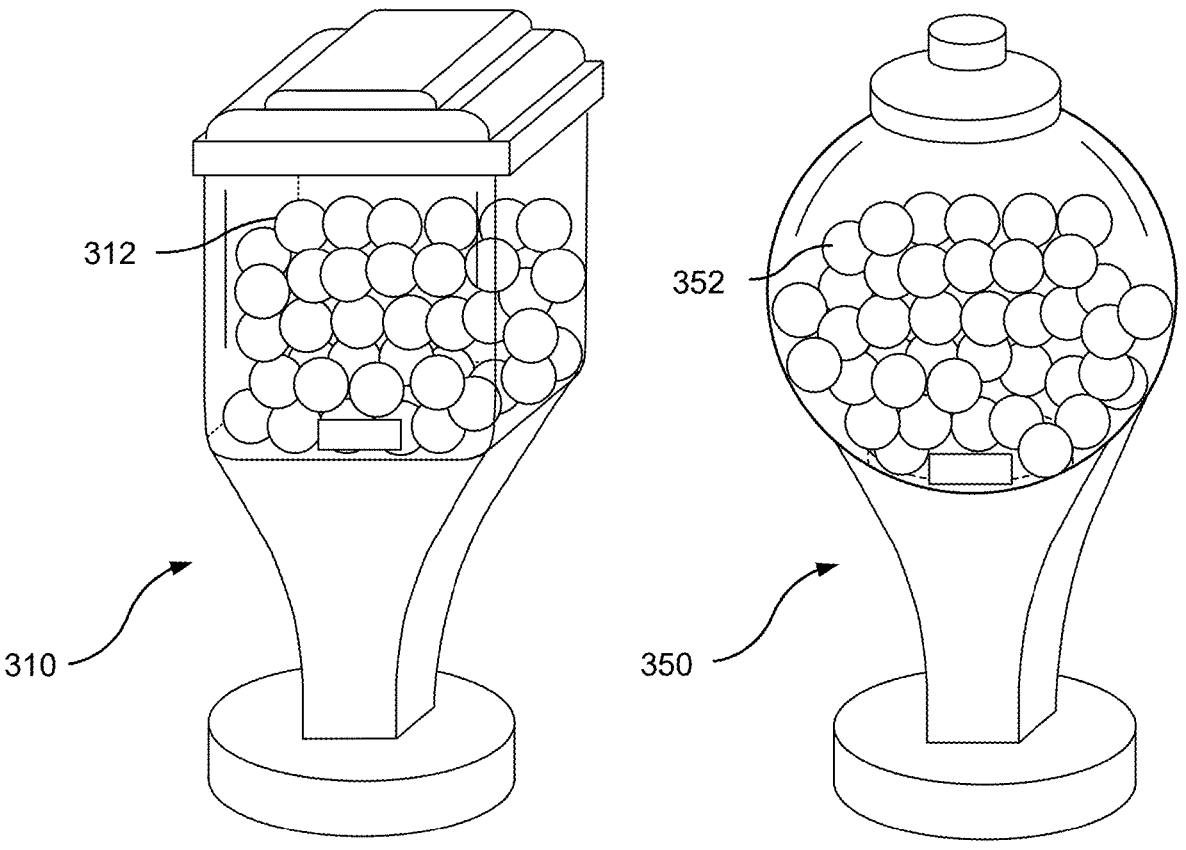
FIG. 3 illustrates examples of virtual object containers, according to embodiments of the present disclosure.

FIG. 3 illustrates examples of virtual object containers, according to embodiments of the present disclosure. In particular, a first virtual token machine 310 is shown on the left-hand side, and a second virtual token machine 350 is shown on the right-hand side.

Generally, a virtual token machine can be presented as a virtual object in an AR session anchored at a position corresponding to a physical location and superimposed on an image or video of a real-world scene. This physical location can be specified in the virtual object container information 215. The presentation can show dispensing units that are contained in the virtual machine. FIG. 3 illustrates the dispensing units as spherical wrappers, where spherical wrappers 312 (e.g., balls, capsules, balloons, etc.) are shown as being contained in the first virtual token machine 310, and spherical wrappers 352 are also shown as being contained in the second virtual token machine 350. The presentation can show other information, such as state of the virtual machine (e.g., available, in use, in use for the next minute, etc.), where this state information can be included in the virtual object container information 215 and may also be presented to a user on a display of the user device.

In an example, the first virtual token machine 310 is associated with a first physical location (e.g., S2 cells, geo-location, zip code, geofenced area, etc.) and the second virtual token machine 350 is associated with a second, possibly different, physical location. In this example, the virtual object container information 215 indicates a different presentation format for each of the two machines 310 and 350 such that the first virtual token machine 310 is shown as having a rectangular container retaining the spherical wrapper 312 and such that the second virtual token machine 350 is shown as having a spherical container retaining the spherical wrapper 352. Of course, the virtual object container information 215 and/or the virtual object information 216 can specify the presentation formats of the container units (e.g., spherical wrappers in the illustration of FIG. 3) and these presentation formats can differ between the first virtual token machine 310 and the second virtual token machine 350, even in cases where the first virtual token machine 310 are the second virtual machine 350 may represent a common machine.

In another example, the two virtual token machines 310 and 350 are associated with the same physical location. In this example, the virtual token machines 310 and 350 can correspond to two instantiations of the same virtual token machine and, thus, contain the same container units. In this case, the virtual token machine presentation formats can differ based on a context (e.g., a user context and/or a device context). Here also, the container unit presentation formats may, but need not, be the same. Of particular note, because an inventory or collection of tokens may be managed distinctly from the virtual token machines, the inventive subject provides for a high degree of configurations and control over the ecosystem. Collections of tokens may be mixed or matched with various virtual token machines under nearly any definable conditions or rules as established by the corresponding operators.

In yet another example, the two virtual token machines 310 and 350 are associated with the same physical location but are not two instantiations of the same virtual token machine. Instead, they are separate and different virtual token machines and, thus, contain different container units and are managed separately and independently of each other. In this example, the first virtual token machine 310 can be presented in an AR session based on a first context (e.g., a user context indicating a preference for a machine type corresponding to the first virtual token machine 310). The second virtual token machine 350 can be presented in the same or a different AR session based on a second context (e.g., a context indicating that the first virtual token machine 310 is currently in use, whereas the second virtual token machine 350 is available).

When a virtual token machine is presented in an AR session, the presentation corresponds to a view of the virtual token machine. An application can send information about the view to the user service 213 (e.g., the identifier of the virtual token machine, an identifier of the AR session, a length of time during which the virtual token machine is shown in the AR session, the start time of the view, the end time of the view, the type, number, and timing of user interactions with the virtual token machine in the AR session, etc.). The user service 213 can track the views and generate statistical measures over time, such as the number of views, their timing, their cadence, etc. Some of the statistical measures can influence the presentation format of the virtual token machine. For example, if the number of views is lower than a threshold number or has been decreasing over time at a rate larger than a threshold rate, the virtual token machine can be shown as aging or presented in a more prominent fashion to entice users. For example, the presentation format can specify that the virtual token machine should be shown as rusting, covered in dust, having growing moss, etc. By showing the aging, users may be enticed to interact with the virtual token machine because they may presume that it may contain some unique collectible NFTs. In some scenarios, the virtual token machine may be presented in different forms as it ages. If it hasn't been used in some time, then it may be rendered as a pinball machine that vends tokens rather than a gashapon machine the vends tokens.

In another example, the presentation format can specify that the virtual token machine is to be anchored to the physical location and cannot be mobile. In this case, when the physical location is in the FOV of the user device, the virtual token machine is presented. Otherwise, the virtual token machine is no longer presented. Further, when the machine is not within the field of view, an indication on the display of the user device may indicate in which direction the user device should pan to find the vending machine. Example techniques for providing such indications may be found in U.S. Pat. No. 7,775,437 to Cohen titled "Methods and Devices for Detecting Linkable Objects," filed Jun. 1, 2006, which is incorporated herein by reference in its entirety.

In another example, the presentation format can specify that the virtual token machine is to be anchored to the physical location and its presentation can persist with the movement of the user until an end event. In this case, when the physical location is in the FOV of the user device, the virtual token machine is presented. Its presentation persists as the user moves away from the physical location and persists even when the physical location is no longer in the FOV. This can be the case, when for example, the user arrives to the physical location and then uses a mode of transportation (e.g., rides the bus) while wanting to continue the interaction with the virtual token machine. The end event can be a threshold distance away from the physical location, a user selectable option to dismiss the presentation, a termination of the AR session, the entry of a different physical location associated with another virtual token machine in the FOV, the presentation of the other virtual token machine, etc.

In an example, a virtual token machine need not be anchored to a physical location. Instead, the virtual token machine can be anchored to an object, where the object can be mobile. In particular, the virtual object container information 215 can include an association between the virtual token machine (e.g., its identifier) with the mobile object (e.g., its identifier). Based on this association, the physical location of the virtual token machine corresponds to the physical location of the mobile object. As such, when the mobile object moves, the physical location for anchoring and/or for showing the virtual token machine in an overlay of the physical world can also change. Different possible mobile objects are possible depending on the use case. For example, in the use case of a theme park, the mobile object can be a theme park character. In the use case of a group of users playing an augmented reality game, the mobile object can be one of the users. In the use case of a traveling vehicle providing a service to users, the mobile object can be the traveling vehicle.

As described herein above, different triggers are possible to show a virtual token machine in an AR session. Proximity, barcode or QR code scanning, context determination, and object detection are examples of such triggers. The virtual object container information 215 can store the relevant information for these triggers (e.g., proximity threshold(s), barcodes or QR codes, object identifiers, context activation criteria, or features, etc.) for comparison to information of the user device (e.g., physical location of the user device, barcode or QR code scan, image data showing objects).

Referring to proximity (e.g., distance between a user device and a physical anchoring point), the proximity can be compared to a set of thresholds (e.g., a threshold distance and/or a direction distance) to trigger the presentation. These thresholds can also depend on one or more contexts, including user context(s) and device context(s). For example, if the user device is associated with a particular type of user account and/or if the user account has a particular subscription, the threshold distance can be made larger such that the virtual token machine would appear in the AR session from a farther away distance than when it may appear for another user account.

Different criteria are possible to enable user interactions with the virtual token machine. One example criterion is proximity-based, whereby the user device needs to be in proximity to the physical location associated with the virtual token machine. Another example criterion is account based. In particular, the user device is associated with a user account and this user account, such as a digital wallet, needs to have a sufficient balance for the user interaction, a type of subscription, etc. Here, the virtual object container information 215 can indicate a cost per user interaction, a needed subscription, etc. As long as the balance includes an amount larger than the cost, as long as the user account has the proper subscription, etc. the user interaction is enabled. Yet another example criterion can be a path criterion that relates to a history of the user device (or, more generally, the user) in the real-world. This history can represent movement over time. In particular, the virtual object container information 215 can indicate that a certain path in the real-world has to be taken for the user interaction to be enabled, such as requiring the user to visit a number of waypoints that belong to a physical path and/or perform certain action(s) at each waypoint. Information can be received from the user device (or from another user device operated by the user and associated with the user account) and/or from a device at a waypoint indicating that the user visited the waypoint and/or performed the action(s) at the waypoint (e.g., the information can include location information showing proximity, a scan of a code at the waypoint, an image of the waypoint, an image of the user device at the waypoint, etc.). Once the path criterion has been satisfied (e.g., the information received over time indicates that the device location contributed to satisfaction of the path criterion and/or that the actions were taken), the user interaction can be enabled. Example techniques for presenting AR content (i.e., virtual token machine) based on context include those described in U.S. Pat. No. 10,403,051 to Soon-Shiong titled "Interference Based Augmented Reality Hosting Platforms," filed Nov. 9, 2018, which is incorporated herein by reference in its entirety. The disclosed techniques may be adapted for use with the disclosed inventive subject. For example, a user in a shopping context may be presented with enhanced or highlighted virtual token machines that are owner or operated by particular brands. Meanwhile, virtual token machines that are considered less relevant (e.g., healthcare machines, gaming machines, etc.) may be downplayed, possibly by reducing their size, presenting silhouettes of the machines, graying the machines out, or other by other forms of reducing the machines AR presence.

Figure 4:
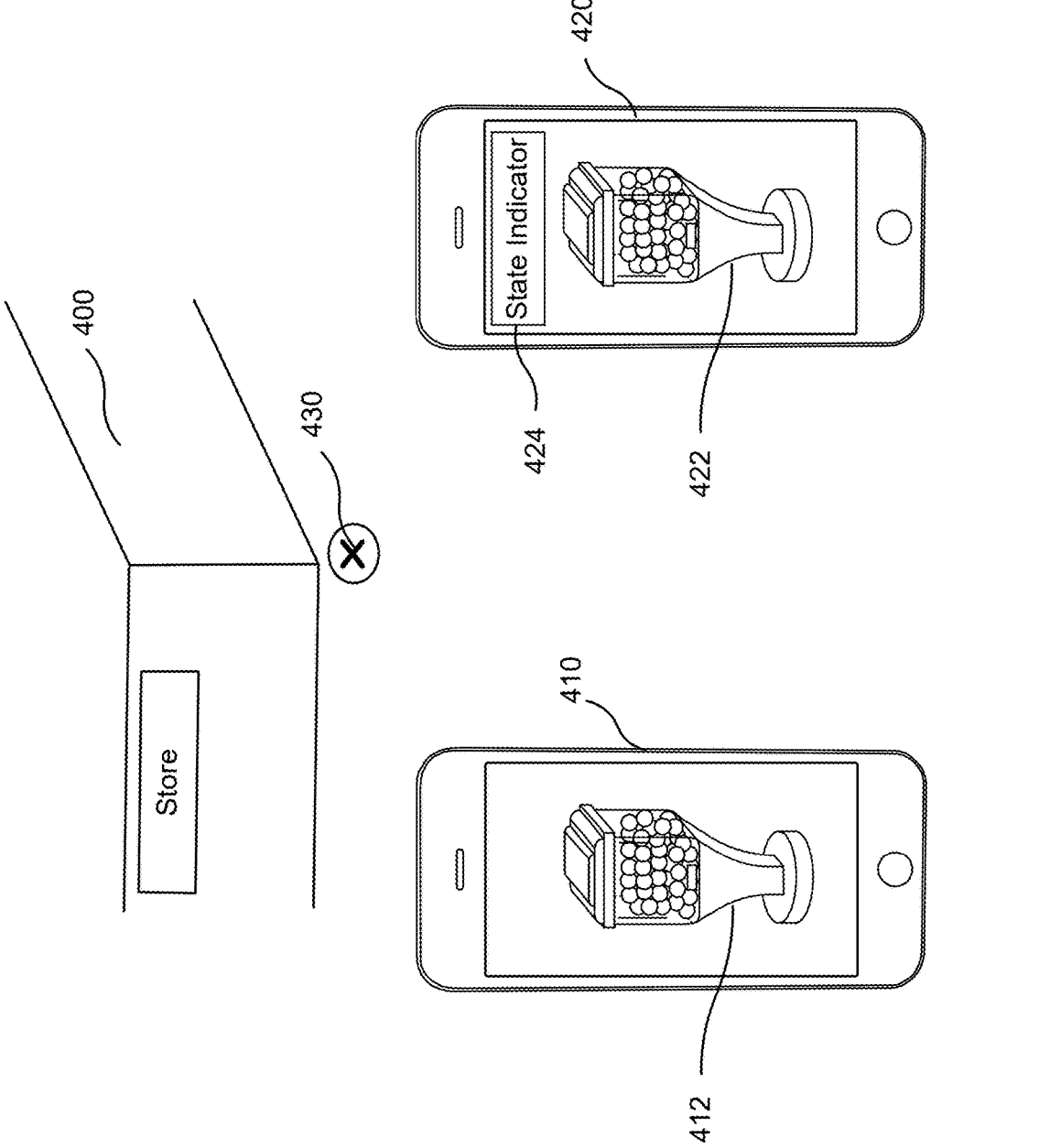
FIG. 4 illustrates an example of interactions by multiple users with virtual object containers, according to embodiments of the present disclosure.

FIG. 4 illustrates an example of interactions by multiple users with virtual object containers, according to embodiments of the present disclosure. As illustrated, a physical structure 400 can be visited by two users each operating a different user device (shown as a first user device 410 and a second user device 420), typically a mobile smart phone or tablet for example. A physical location 430 outside the physical structure 400 (alternatively, inside the physical structure 400 or on a wall, surface, or other physical object of the physical structure 400) can be associated with a virtual token machine. Although two user devices 410 and 420 are illustrated in FIG. 4, the embodiments of the present disclosure similarly apply to a larger number of devices.

The first user device 410 can present a first instantiation 412 of a virtual token machine upon its proximity to the physical location 430 (or any other trigger as described herein above). Similarly, the second user device 420 can present a second instantiation 422 of the same virtual token machine upon its proximity to the physical location 430 (or any other trigger as described herein above).

In an example, the first instantiation 412 corresponds to program code executed on the first user device 410, whereas the second instantiation 422 corresponds to program code executed on the second user device 420. In another example, the instantiations 412 and 422 correspond to program code executed on a computer system, such as computer system 210 of FIG. 2, where each of the two user devices 410 and 420 presents a result of the instantiation. In both cases, the presentation of the virtual token machine can be synchronized across the two user devices 410 and 420. The synchronization can be across multiple dimensions.

In one example dimension, the look and feel of the virtual token machine can be made the same on both user devices 410 and 420. However, that may not always be the case where the presentation can be customized depending on contexts or based on an operators defined operational parameters. In particular, the first user of the first user device 410 and/or the first user device 410 can be associated with a different set of contexts than those of the second user of the second user device 420 and/or the second user device 420. In such a case, the virtual object container information 415 may specify a presentation format per set of contexts. Accordingly, the presentations of the virtual token machine can look different on the two user devices 410 and 420.

In another example dimension, the triggers to show the virtual token machine in the AR sessions can be the same. In particular, when each user device 410 and 420 is within a threshold distance to the physical location 430 or where other distance-based criteria are satisfied, the virtual token machine can appear in the AR session on the corresponding user device 410 or 420. However, as described herein above, based on user account information, the threshold distance can be made different.

In another example dimension, the use of the virtual token machine in the AR sessions can be synchronized. In particular, when the virtual token machine is in-use by the first user device 410, a state indicator 424 can be shown on the second user device 420 to indicate that the virtual token machine is in-use by another user device and/or is currently unusable by the second user device 420. Depending on user settings, including permissions, that can be defined in user account information, additional information can be shown on the second user device 420, such as an identifier of the first user, a relative distance/direction between the second user device 420 and the first user device 410, an expected time until the virtual token machine becomes usable to the second user device 420, an option to request a turn for using the virtual token machine, an option to contact (e.g., text message, chat message, phone call, etc.) the first user device 410, etc.

To do so, the computer system maintains a use queue based on a priority. The priority can be based on a first come, first served basis. In particular, the first instantiation 412 of the virtual token machine occurs prior to the second instantiation 422. In this case, the computer system maintains timestamps corresponding to the two instantiations 412 and 422. Given that the first instantiation 412 has an earlier timestamp, the first instantiation 412 would have a higher priority in the use queue. Accordingly, the AR session on the first user device 410 enables the first user to use the virtual token machine, whereas the AR session on the second user device 420 disables this use and shows the state indicator 420 (and any other additional information) until a change in the use queue. The priority can additionally or alternatively be based on user account information. In particular, the first user may have higher account priority that the second user based on their corresponding user accounts and/or subscriptions. Given that the first user has a higher priority, the first instantiation 412 would have a higher priority in the use queue.

Different techniques exist to change the use queue. In one example, when the first user interacts with the virtual token machine to obtain a token (or a container unit), the use queue is updated by placing the first user at the end of the use queue and enabling the interaction to the next user in the queue, such as the second user in the illustration of FIG. 4. In another example, the first user device 410 can present an option to skip a turn. If this option is selected, the computer system changes the use queue. Likewise, the first user device 410 can present an option to extend the turn (e.g., by extending the timing, increasing the number of interactions, etc.). If this option is selected, the computer system changes the use queue. If the turn is extended, the cost per interaction can be increased. In yet another example, each turn is associated with a time frame during which the virtual token machine is used. In particular, when queued to have the next turn, this next turn remains effective until the end of the time frame. Thereafter, the next user is queued up. The time frame can depend on a number of factors, such as the user context(s) and/or device context(s). In particular, depending on the user account information, the time frame can be made longer or shorter. In a further example, the use queue can be associated with a number of interactions per turn. Per turn, each user can have a number of available interactions (e.g., one interaction, two interactions, or any other number of interactions). When the number of interactions is used, the computer system changes the use queue to the next user. Here also, the number of interactions can be set based on factors, such as the user context(s) and/or device context(s) (including user account information). In a further example, the time frame and/or number of interactions can depend on the total number of instantiations of the virtual token machine. Generally, the larger the number of users that are viewing the virtual token machine, the shorter the turn for each user can be made. The length of the turn can be defined in time (e.g., a time duration) in number of interactions with the virtual token machine. Shortening the turn per user can allow a greater distributed use among the users.

In a further example of synchronized dimensions, information about an interaction with the virtual token machine via the first user device 410 can be shown on the second user device 420. In particular, as the first user interacts with the virtual token device, this interaction can be shown on the second user device 420. As such, when a container unit is shown on the first user device 410 as being dispensed from the virtual token machine and the total count of container units is shown on the first user device 410 as being reduced by one, the same container unit can be shown on the second user device 420 as being dispensed and/or the total count can be shown on the user device 420 as being reduced. Depending on the user settings, when the container unit is opened to reveal a token on the first user device 410, the opening of the container unit and/or the token can also be shown on the second user device 420. In these various cases, the computer system receives interaction data from the first user device 410, updates the virtual object information 216 to reflect the changes corresponding to the interactions (e.g., by determining an identifier of the container unit, maintaining a state of this unit, determining an identifier of the corresponding token, maintaining a state of the token, etc.), and synchronizes the presentation on the second user device 410 according to the changes. One should appreciate that such approaches may provide for deterministic operation of the virtual token machines, which provides creating trusted or trustable market campaigns because deterministic operations may be auditable.

Different types of the state indicator 420 are possible. For example, the state indicator 420 can take the form of any or a combination of a text, a graphic, and/or animation. Further, state indicator 420 can be integrated with the presentation of the virtual token machine. In particular, the look and feel of the virtual token machine can be updated to show it in use (e.g., its color and/or shape can change).

Figure 5:
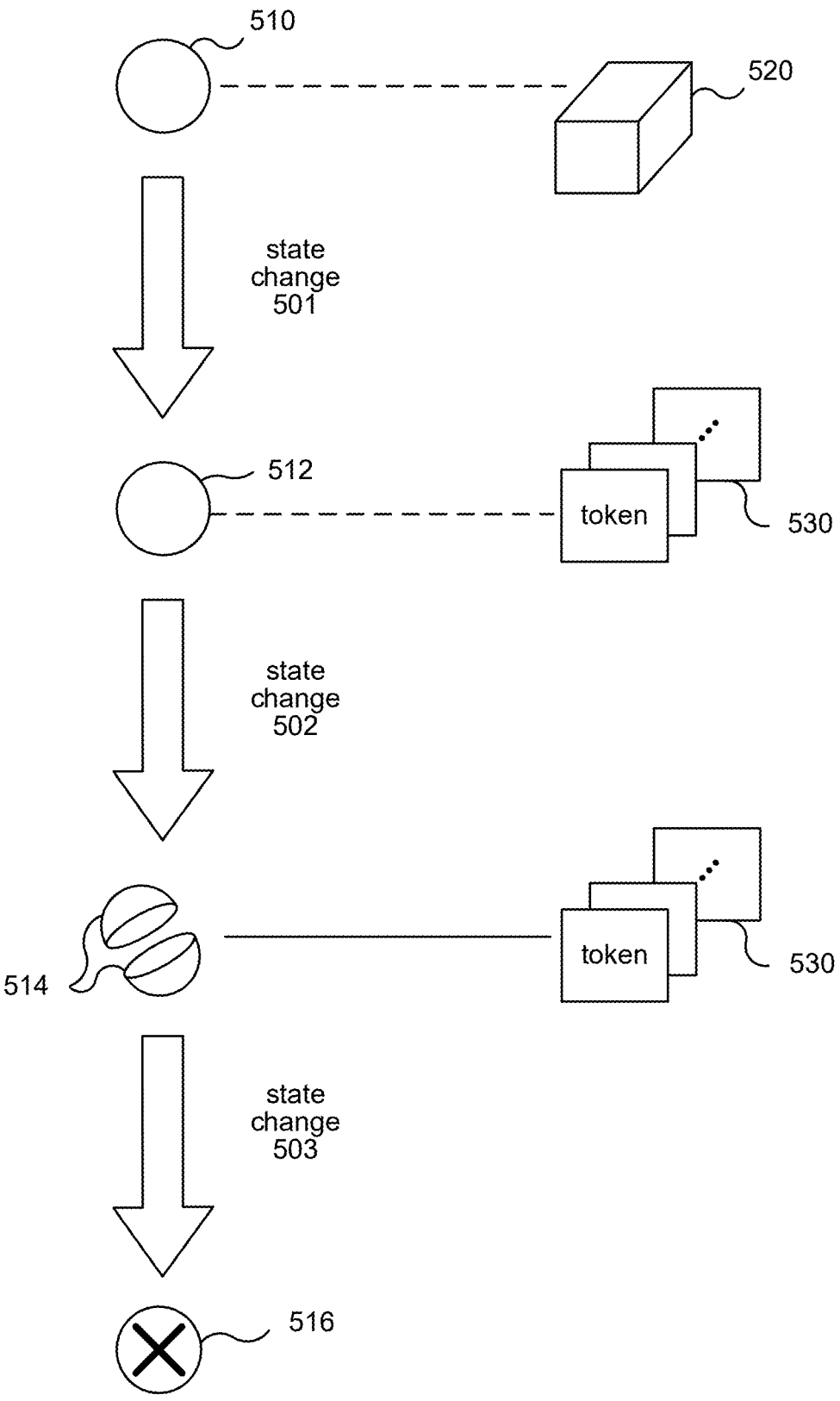
FIG. 5 illustrates an example of a container unit that can be contained in a virtual object container and that can be associated with one or more tokens, according to embodiments of the present disclosure.

FIG. 5 illustrates an example of a container unit that can be contained in a virtual object container, such as a virtual token machine, and that can be associated with one or more tokens, according to embodiments of the present disclosure. The container unit can be presented in an AR session as one of a plurality of container units inside the virtual token machine. The container unit can be associated with a state that is updatable based on the interactions with the virtual token machine. The presentation of the container unit can depend on the state and other factors, such as one or more contexts, including user context(s) and/or device context(s). It should be appreciated that the container unit may be distinct from the NFT contained therein, or may be coupled with the NFT contained therein.

In the top part of FIG. 5, two different presentation styles of the same container unit are shown: a spherical wrapper 510 on the left and a rectangular wrapper 520 on the right (although other presentation styles are possible). Generally, a presentation style corresponds to parameters defining the look and feel of the container unit to use for presenting the virtual container in an AR session. Such parameters can include the shape, color, size, texture, logos, brands, color brightness, etc. Some of the parameters can be global to the collection of container units that can be shown in the virtual token machine. Such parameters include, for example, the shape and texture. The remaining parameters can be specific to each virtual container of the collection such that the container units look different (e.g., by having a different color, different color brightness, etc.) when presented in the AR session. The global parameters can be defined in the virtual object information 216 and/or virtual object container information 215 by including in such information 216 and/or 215 an identifier of the collection and the value of such parameters. The remaining parameters can be defined in the virtual object information 216 by including in such information 216 an identifier of each container unit and the corresponding parametric values. Container units may also be instrumented with other presentation parameters including corresponding audio to be played, animations to be rendered, tactile feedback, game play, puzzles to be solved to unlock the token, or other presentation modalities.

Further, these parameters can be associated in the virtual object information 216 and/or virtual object container information 215, as applicable, with a set of contexts. For example, given a first user context and/or a first device context, the virtual object information 216 and/or virtual object container information 215 indicate that the spherical wrapper presentation style is to be used, whereas given a second user context and/or a second device context, the virtual object information 216 and/or virtual object container information 215 indicate that the rectangular wrapper presentation style is to be used. Similarly, given a first user preference (which may indicate a color blindness), the virtual object information 216 can indicate that only particular colors can be used.

In the illustration of FIG. 5, the spherical wrapper presentation style is assumed to be used. In this case, all the container units shown inside the virtual token machine in the AR session have spherical shapes, although their colors and/or other container unit-specific parameters can differ.

As described herein above in association with updating the presentation of a virtual token machine based on a number of factors, such as the number of views over a period of time, presentation updates to the container unit can also be updated based on some or all of these factors. For example, when the number of views of the virtual token machine containing the collection of the tokens decreases over time, not only the virtual token machine is shown to be "aging," but also each one of the container units is also shown to be aging. For each container unit, the color or the color brightness can change, the texture can be updated, moss and/or dust can be shown. These aging presentation parameters can be defined in the virtual object information 216 and/or virtual object container information 215. Hence, upon determining the decrease in the number of views, and upon an instantiation of the virtual token machine for presentation by a user device, the computer system determines the applicable aging presentation parameter(s) and instructs the user device to present the container units at least in part using the applicable aging presentation parameter(s).

Generally, the collection of container units can be deterministic. In particular, a computer system, such as the computer system 210 of FIG. 2, can instantiate or cause a user device to instantiate the collection according to a deterministic rule set. This rule set can indicate a sequence for dispensing the container units. According to this rule set, the container unit can be associated with a sequence identifier "K." In this case, it would be dispensed after a container unit having a sequence identifier "K−1" and before a container unit having a sequence identifier "K+1." The sequence identifiers can, but need not, be the same as the container unit's identifier itself. The virtual object information 216 can include the container unit's identifier and, if different, the sequence identifier. Other examples of methods for generating deterministic behaviors can include using one or more of a pseudo random number generator with a known seed, a deterministic hash function, a program code assigned to the collection or virtual token machine that includes instructions on the order of which tokens to vend, or other deterministic techniques. As explained herein above, it may be possible to use non-deterministic rule sets. In particular, the dispensing of container units can be random or pseudo-random. In this case, the instantiation of the collection occurs at least in part according to a random function.

Information about the collection of container units can be included in the virtual object information 216 and can indicate, among other things, an identifier of the collection, identifiers of the container units that belong to the collection, a current count of available container units, a count of container units already dispensed and no longer available, etc. The instantiation of the collection, on the computer system or the user device, can depend on a previous instantiation, whereby the collection information is used for continuity across the instantiations. In particular, if the previous instantiation resulted in dispensing one or more container units, only the currently available container units can be shown in the current instantiation. The instantiation of the collection of virtual objects can at least in part be based on an inventory function of the AR virtual object container, where parameters of this inventory function can be defined in the virtual object container information 215. The inventory function can operate according to a deterministic inventory, such as that the dispensing of the container units is deterministic. One should appreciate that the inventory function may be assigned to a single instance of a virtual token machine, multiple instances of the same virtual token machine, many different virtual token machines, or other variations. For example, many different virtual token machines may be placed around the world, but all leverage the same inventory pool of thousands, millions, or more of tokens. Such a massive pool may be ordered so the tokens are provided to users according to the order. Time stamps may be used to determine which user was first to engage the machines to ensure the deterministic order is preserved.

In addition, the container unit can be associated with a set of tokens, where the size of this set can be one or more than one token. A token association can represent including a token in the container unit and/or including information for retrieving the token from a source and/or creating the token on the fly (e.g., minting it when the container unit is obtained from the virtual token machine and/or when the container unit's state changes to being in an opened state, etc.). The virtual object information 216 can indicate the token association by including, in association with the container unit's identifier, an identifier of the token and/or of the information for retrieving and/or creating the token. If the container unit is associated with more than one token, when the container unit is dispensed for a user having a user account, the associated tokens would then be recorded as being owned by the user (e.g., by updating a record that associates the token identifiers and the user account identifier, among other information).

In an example, the container unit is a virtual object that represents a wrapper to be shown in an AR session as containing the set of tokens. In another example, the container unit can be a token, such as an NFT, where this token represents the wrapper. In this case, the container unit can be created and associated with the underlying set of tokens using standard protocols, such as protocols defined in the ERC-721 standard, ERC-998 standard, ERC-1155 standard, or new standards yet to be created. According to ERC-721 transactions relating to an NFT (e.g., minting, transfers, burning, etc.) are recorded on the Ethereum blockchain to retain a ledger of all desired actions or transactions associated with the NFT. ERC-998 defines interfaces for creating tokens comprising sub tokens and vice versa. Yet further, ERC-1155 defines interfaces by which one can create token sets. As individuals interact with Ethereum tokens via one or more transactions, the transactions are recorded on the Ethereum blockchain thereby forming an immutable ledger of the existence of such tokens. While Ethereum is referenced for illustrative purposes, the inventive subject matter is not so limited. Each notarized ledger technology may have their standardized interfaces through which tokens are managed. Other standards are possible and NFTs or ledger tokens used in embodiments of the present disclosure can abide to such standards including any or a combination of NEO standards (NEP5, NEP11, etc.), TREZOS standards (TZIP7, TZIP12, etc.), EOS standards, FLOW standards, SOLANA standards, AVALANCHE standards, or other existing standards and those yet to be created. It should be appreciated that terms such as "tokens," "digital tokens," "NFTs," and are with reference to their corresponding underlying notarized ledger technology and are not limited to Ethereum standards.

The container unit (e.g., an AR capsule, a virtual beverage container, etc.) can also be associated with a state and this state can be updated based on user interactions. The state can be stored as state information in the virtual object information 216 or as a linked data structure (e.g., state object, etc.) storing the information, where each container unit identifier is associated with a state identifier, and where each state identifier corresponds to one or more possible predefined states. Example states include not dispensed, dispensed and unopened, dispensed and opened, and discarded. Referring back to the illustration of FIG. 5, the container unit is initially presented according to a "not dispensed state." This state corresponds to the container unit being inside the virtual token machine. By default, when the collection container unit is created, all the container units are in the not dispensed state. When a user device is presenting the virtual token machine in an AR session, the state information for the container unit (along with the presentation parameters) can be determined from the virtual object information 216 (which may be stored by the computer system and/or which may be pushed to the user device) and used to present it according to this state. In the illustration of FIG. 5, the spherical wrapper 510 is shown as being unopened.

Next, a user interaction occurs via the user device resulting in the dispensing of the container unit (e.g., based on the container unit being the next in the dispensing sequence, based on random number, based on deterministic game play, etc.). This user interaction results in a state change 501. Information about the user interaction can be sent to the computer system that then updates the virtual object information 216 to reflect the state change 501 and/or the user device can make this update locally to its copy of the virtual object information 216 and this copy can be subsequently synchronized with the virtual object information 216. In both cases, the state change 501 can follow a sequence, a state machine, a state graph, or a state directed graph.

In particular, given the current state (not dispensed) and the type of user interaction, the next state may be determined to be "dispensed and unopened." The virtual object information 216 is updated to associate the container unit's identifier with the state identifier of the "dispensed and unopened state." The presentation parameters applicable to this state are used in the AR session such that to show the container unit has been dispensed from the virtual token machine. The user device and/or the computer system can also update the user account information to associate the container unit with the user account. A transaction can be recoded (such as by using the transaction system 240 of FIG. 2) to also record data about the dispensing (such as by recording the container unit's identifier and state, the user account's identifier, the virtual token machine's identifier, the timing of the user interaction, the user context(s), the device context(s), the physical location, etc.).

In the "dispensed and unopened state," the spherical wrapper 510 continues to be shown (except now that it is outside of the virtual token machine). A set of tokens 530 associated with the container unit is not revealed yet in the AR session for the user (as illustrated with the dashed line).

Subsequently, another user interaction occurs via the user device resulting in another state change 502 to the container unit. This user interaction can be with the spherical wrapper 510 or the virtual token machine shown in the AR session. Information about the user interaction can be sent to the computer system that then updates the virtual object information 216 to reflect the state change 502 and/or the user device can make this update locally to its copy of the virtual object information 216 and this copy can be subsequently synchronized with the virtual object information 216. In both cases, the state change 502 can follow the sequence or the directed graph.

In particular, given the current state (dispensed and unopened) and the type of user interaction, the next state is determined to be "dispensed and opened." The virtual object information 216 is updated to associate the container unit's identifier with the state identifier of the "dispensed and opened state." The presentation parameters applicable to this state are used in the AR session such that to show the container unit has been opened. The user device and/or the computer system can also update the user account information to associate token identifier(s) of the set of tokens 530 with the user account. A transaction can be recoded (such as by using the transaction system 240 of FIG. 2) to also record data about the opening (such as by recording the container unit's identifier and state, the user account's identifier, the token identifier(s), the virtual token machine's identifier, the timing of the user interaction, the user context(s), the device context(s), the physical location, etc.).

In the "dispensed and opened state," the container unit is shown as two separated spherical halves 514. The set of tokens 530 associated with the container unit is revealed in the AR session for the user (as illustrated with the solid line), whereby the user can get a visual of the token(s) that has (have) been unwrapped.

A further user interaction can occur via the user device to discard the container unit, resulting in another state change 503 to the container unit. This user interaction can be with the spherical halves 514 or the virtual token machine shown in the AR session. Alternatively, no additional user interaction may be needed and this second state change 503 can occur automatically after the state change 502. Assuming a user interaction, information about the user interaction can be sent to the computer system that then updates the virtual object information 216 to reflect the state change 503 and/or the user device can make this update locally to its copy of the virtual object information 216 and this copy can be subsequently synchronized with the virtual object information 216. In both cases, the state change 503 can follow the sequence or the directed graph.

In particular, given the current state (opened) and the type of user interaction, the next state is determined to be "discarded." The virtual object information 216 is updated to associate the container unit's identifier with the state identifier of the "discarded state." The presentation parameters applicable to this state are used in the AR session such that to show the container unit has been discarded. A transaction can be recoded (such as by using the transaction system 240 of FIG. 2) to also record data about the discarding (such as by recording the container unit's identifier and state, the user account's identifier, the token identifier(s), the virtual token machine's identifier, the timing of the user interaction, the user context(s), the device context(s), the physical location, etc.). In an example where the container unit is a token, the discarding can correspond to burning the token, where the burning is recorded on the corresponding notarized ledger.

In the "discarded state," the container unit is no longer presented in the AR session. This is illustrated with the "X" mark 516 over the spherical wrapper in FIG. 5. Thus, while the above discussion with respect to FIG. 5 describes a possible set of states, one should appreciate that a virtual token machine, a container unit, or other aspect of the ecosystem may operate according to a state machine, where the state machine may include the states discussed above or other possible states. Use of a state machine to manage the virtual token machines, container units, digital tokens, or features of the system provides numerous advantages. As alluded to above, a container unit may not be opened and thereby it's corresponding digital tokens (e.g., NFTs, etc.) may not be known. Thus, the container unit and its unknown token could be bought and sold while in its current state and thereby remain intact. Such an approach gives rise to a potential secondary market for collectibles and allowing the computer-based ecosystem to manage the digital tokens, container units, or other objects as they change hands in a specific state, which further can be subject to data analysis with respect to possible monetization campaigns. Providing for such secondary markets is akin to the secondary market for trading, buying, sell or other engaging in transactions associated with unopened trading card packs (e.g., baseball cards, Magic The Gathering™ cards, Pokemon cards, etc.). However, the disclosed approach provides the technical advantage of being able to digital track provenance of the digital tokens (i.e., the collectible) as well as the container user (e.g., capsule, trading pack, etc.).

Figure 6:
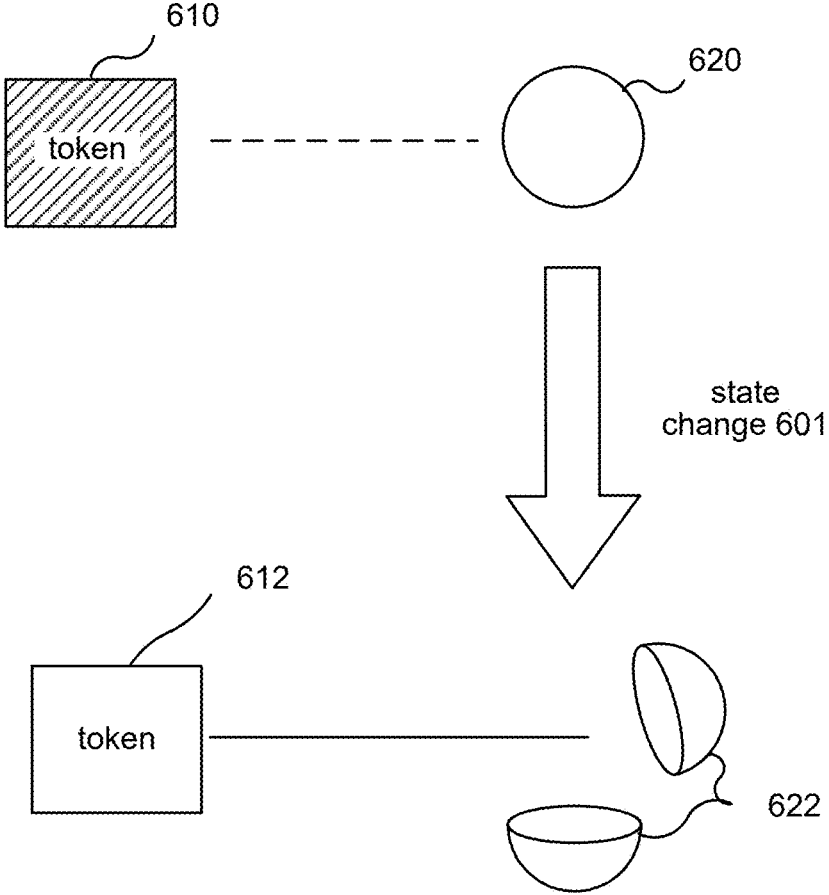
FIG. 6 illustrates an example of a token that can be associated with a container unit, according to embodiments of the present disclosure.

FIG. 6 illustrates an example of a token 610 that can be associated with a container unit 620, according to embodiments of the present disclosure. Although a single token 610 is associated, one or more additional tokens can be also associated with the container unit 620, possibly as part of a collectible set. In such cases, similar information used to manage the token 610 can also be maintained to manage the additional token(s). The information about the token 610 can be included in the virtual object information 216.

Generally, the token 610 can be created (e.g., minted, etc.) prior to container unit 620 being dispensed, created after the container unit 620 is dispensed but is unopened, or created after the container unit 620 is dispensed and opened. If created prior to the dispensing, the token can have a token identifier (e.g., token number, GUID, UUID, hash value, etc.) and this token identifier can be included in the virtual object information 216 in association with an identifier of the container unit 620. If created after the dispensing, information for creating the token can be associated, in the virtual object information 216, with the container unit's 620 identifier. This information can be a set of instructions executable to invoke a creation procedure (e.g., a minting process, etc.) local to a computer system (e.g., the computer system 210 of FIG. 2) or accessible to a user device and/or the computer system from another system via an interface (e.g., from the transaction system 240 of FIG. 2, etc.). The creation procedure can be identified using an identifier that is included in the virtual object information 216. The token 610 can be created using one or more protocols (e.g., ERC-721 standard, ERC-998 standard, ERC-1155 standard, etc.). For example, token 610 may be created via calling a minting function of a smart contract associated with the corresponding notarized ledger.

The token 610 can also be associated with a state that can depend on a number of factors including the state of the container wrapper 620 and/or the creation of the token 610. For example, the state can be one of "not created and not revealed," "created and not revealed," or "created and revealed." The "not created and not revealed" state applies when the token 610 is created on the fly and when the container unit 620 is in a "not dispensed state" or in a "dispensed and unopened state." In the case when the token is created prior to the dispensing, the "created and not revealed" state applies when the container unit 620 is in a "not dispensed state" or in a "dispensed and unopened state." When the container unit 620 is in a "dispensed and opened state," the state of the token can be "created and revealed." The computer system can use a directed graph to maintain the state of the token based on its creation procedure and the state of the container unit's 620 state.

In the illustration of FIG. 6, the container unit 620 is shown in an AR session in a "dispensed and unopened state" by being presented as a spherical wrapper (one should appreciate other presentation styles are possible and can be configurable). Based on the information available from the virtual object information 216 about the token 610, the AR session does not present the token 610. Instead, the AR session can show an indicator 612 that that the token 610 has been obtained. This indicator 612 can be a GUI element shown in the AR session notifying the user that a token is added to their user account, without revealing the token 610. The information added to the user account can include any or a combination of the token identifier, the creation procedure identifier, a network address where the token is stored, a network address of the creation procedure, etc.

A user interaction occurs via the user device and results in a state change 601. Here, the state change 601 is to both the container unit 620 and the token 610. In particular, the container unit's 620 state is "dispensed and opened." The token's 610 state is "created and revealed." In this case, information about the user interaction can be sent to the computer system that then updates the virtual object information 216 to reflect the state change 601 and/or the user device can make this update locally to its copy of the virtual object information 216 and this copy can be subsequently synchronized with the virtual object information 216. In both cases, the state to the token's 610 state can follow the directed graph. One should appreciate that states provided (e.g., "dispensed and opened," "created and revealed," etc.) can be consider to represent compound states. In some embodiments, states may be represented as discrete states, with no overlap with other states.

Based on the state change 601, the AR session is updated to show an updated presentation of the container unit 620 and to reveal the token 610 as driven by the state change. The updated presentation shows two spherical halves 622 of the container unit 620 such that to indicate that it is in the dispensed and opened state. The asset that the token 610 protects is also indicated in the AR session by showing it as any or a combination of an image, a video, a graphic, a text description, an audio presentation, a tactile feedback, etc.

When a state of the token 610 changes, a record can be generated to indicate this state change. For example, a block in a blockchain or in the corresponding notarized ledger can be stored to indicate the creation, and another block in the blockchain can be stored to indicate the revealing. This latter block can record information about the dispensing and/or opening of the container unit 620, such as the container unit's 620 identifier, the virtual token machine's identifier, the token identifier, user context(s), device context(s), time of dispensing, time of opening the container unit 620, physical location corresponding to the virtual token machine, physical location of the user device when the container unit 620 was opened, etc. Thus, the state change may be recorded via the notarized ledger, which provides for establishing provenance of digital token 110 as well as for auditing corresponding state change transactions.

The token 610 can represent or protect different types of assets. In one example, the asset can be a collectible, such as digital artwork, an image, and/or a graphic. The asset can also be a digital file, such as an audio file, and/or a video file or even an executable program code file. The asset can be an intellectual property work such as a trademark, and/or a copyright work. The asset can also be a functional element, such as an access control (e.g., a digital ticket to access a reserved and/or secured area), a program code, and/or a program code package (e.g., a program code update, a video game character, a video game skin, a texture for a video game skin, a patch on a video game character's outfit, a video game object, etc.) or even a right to vote in a decentralized autonomous organization (DAO). The asset can as a personal record (e.g., a proof of a visit to a location, a proof of a meeting with a particular character, etc.). In the use case of a proof, an image showing the physical location and/or the physical object (e.g., a theme park character) associated with triggering the virtual token machine can be generated by the user device. This image can be protected with the token 610 by minting the token after the container unit 620 is dispensed. One should appreciate minting token 610 may occur before, during, after, or at any other time that may be practical with respect to a desired implementation In an example, a group of user accounts can be associated with tokens based on different factors including one or more of user account subscriptions, user locations, user preferences, etc. In particular, the virtual object information 216 can associate token identifiers with user account identifiers. This association can be implemented to support different use cases including community and/or team building use cases. Specifically, the tokens can be collectibles or pieces that, when put together, can tell a story, describe an event, complete a puzzle, solve a challenge, reveal a secret, partake in a scavenger hunt, etc. Such tokens can be distributed across multiple collections of tokens, each of which can be associated with a virtual token device corresponding to a physical location. As such, user devices corresponding to the user accounts need to be operated at different physical locations to interact with the virtual token machines and collectively obtain the tokens, possibly according to a specific or a define order. The computer system can maintain the virtual object container information 215 to determine the physical locations and the virtual object information 216 to determine what tokens have been obtained and what tokens remain available. Accordingly, the computer system can send information to the user devices showing a tally of at least what has been obtained and the related physical locations, what remains and the possible physical locations, and/or hints about the physical locations. In turn, each user device can present this information, such as in a dashboard, list, map, etc.

Tokens can be stored in a token database that comprises at least in part one of the following: a cloud database, a notarized ledger, a server, a distributed file system (e.g., IPFS, etc.), a file system, a lookup table, or other indexed data storage structures. The token database may, but need not, store the test token itself. Instead, it may reference the token via an address or an identifier (e.g., URL, UUID, GUID, hash address, etc.). The notarized ledger includes at least one of the following: a blockchain, a hash graph, a private ledger, a public ledger, a semi-public ledger, a centralized ledger, or other technology-based ledgers that preferably forms an immutable or near immutable record.

In some embodiments, the interactions with virtual token machines can be based on cryptocurrencies available in user accounts. For the example, the computer system might provide its services based on a custom cryptocurrency or third-party cryptocurrencies (e.g., BitCoin, Ethereum, Solana, Wax, etc.). In such cases, the computer system may exchange tokens (e.g., NFTs, etc.) for cryptocurrency. Such exchanges may occur when an interaction with a virtual token machine occurs. The computer system may also be used when recycling an NFT (e.g., place back into a pool for others to purchase) or when the NFT is dissolved/burned. Further, fees may be distributed across multiple accounts as dictated by one or more smart contracts. Yet, further, fees may include multiple cryptocurrencies distributed across multiple accounts thereby creating a many-to-many fee/account management infrastructure. This can be achieved by an account management or fee management matrix indicating which cryptocurrencies are to be used and to which accounts the transfers should be made. Example techniques for reconciling transactions among multiple accounts that may be adapted for use herein include those described in U.S. Pat. No. 11,004,102 to Soon-Shiong titled "Methods and System for Reconciling a Transaction Within a Computer-Based Game," filed Apr. 6, 2020, which is incorporated herein by reference in its entirety. For example, an account reconciliation matrix may be encoded in a smart contract, which is then invoked when the NFT changes state (e.g., minted, traded, sold, bought, etc.). Such reconciliation matrices may be linked to the NFT, container units, virtual token machines, or other objects in the ecosystem as is practical.

Different use cases are possible. For example, a virtual token machine can be an AR vending machine that provides NFTs. Based on a user interaction therewith, a cryptocurrency transaction can occur, where an NFT is dispensed from the AR vending machine in the AR session and added to a digital wallet of a user.

Another use case can involve a path criterion. Here, waypoints along a path can be defined. Upon detecting that the waypoints have been visited based on user device location data (e.g., GPS, S2 cell identifiers, zip codes, etc.) and, optionally, action(s) have been performed at each waypoint, a virtual token machine can be presented in an AR session, or a user interaction therewith can be enabled in the AR session. This path can relate to a scavenger hunt, a social event, a team building event, or any other event.

A use case can also relate to proof of attendance. In an educational setting, a virtual token machine can be associated with a physical location of a testing center, room, or desk. Proximity of a user device of a test taker to the physical location can enable the virtual token machine to be presented in an AR session and a user interaction therewith to obtain a token. The token can be added to a user account of the test taker. This token can include information representing the proof of attendance. In some embodiments, the token may represent an exam, a text book, or other educational object that may be unlocked or otherwise presented to a user based on their proof of attendance.

Another use case can also relate to proof of presence. In a setting where check to a specified location is needed (e.g., in the context of probation with the police, security watch, etc.), a virtual token machine can be associated with this location. Proximity of a user device of a thereto can enable the virtual token machine to be presented in an AR session and a user interaction therewith to obtain a token. The token can be added to a user account, where this can include information representing the proof of presence. In some scenarios, the token could include an image of the user along with specific location information, a probation offer's image for example.

A similar use case relates to location access. In a ticketing setting where a ticket is needed to access a venue or space, a virtual token machine can be associated with a physical location of the venue or space. Proximity of a user device of a ticket purchaser to the physical location can enable the virtual token machine to be presented in an AR session and a user interaction therewith to obtain a token. The token can be added to a user account of the ticket purchaser. This token can include information representing a ticket to access the venue or space. Such tickets or tokens may be purchased through the exchange of a cryptocurrency associated with the notarized ledger, via a fiat currency via an in-app purchase, or through other suitable transactions.

A further use case includes shopping. In a brick and mortar store or a showroom setting, a virtual token machine can be associated with a physical location of the store or showroom. Proximity of a user device to the physical location (e.g., S2 cell(s), zip code, geofence, etc.) can enable the virtual token machine to be presented in an AR session. In this example, the virtual token machine can enable different selections of items that are available for purchase from the physical location. Such items can be presented as virtual items contained in the virtual token machine (e.g., where this virtual token machine can be presented as an AR planogram, for example). A user interaction can result in a selection of an item. A token can be added to the user account or wallet, where the token includes information identifying the item and providing a proof of purchase. This token can be presented to an associate in the store to obtain the corresponding physical item. Or the user interaction can trigger an online purchase of the physical item that can then be provided by the associate or shipped directly to a destination location.

A healthcare use case is also possible. For example, the virtual token machine can be an AR dispensing machine presenting available protective personal equipment, medicine, or other healthcare items that can be obtained from a healthcare facility. Here, the presentation of the AR dispensing machine and/or a user interaction therewith can be enabled based on a context indicating that the user has the right permission to obtain a healthcare item (such as a prescription authorizing this acquisition can be available to an application executing on the user device and presenting the AR session). The user interaction can result in a selection of a healthcare item. A token can be added to the user account, where the token includes information identifying the item and providing an authorization to obtain it. This token can be presented to an authorized person in the healthcare facility to obtain the corresponding physical healthcare item.

Figure 7:
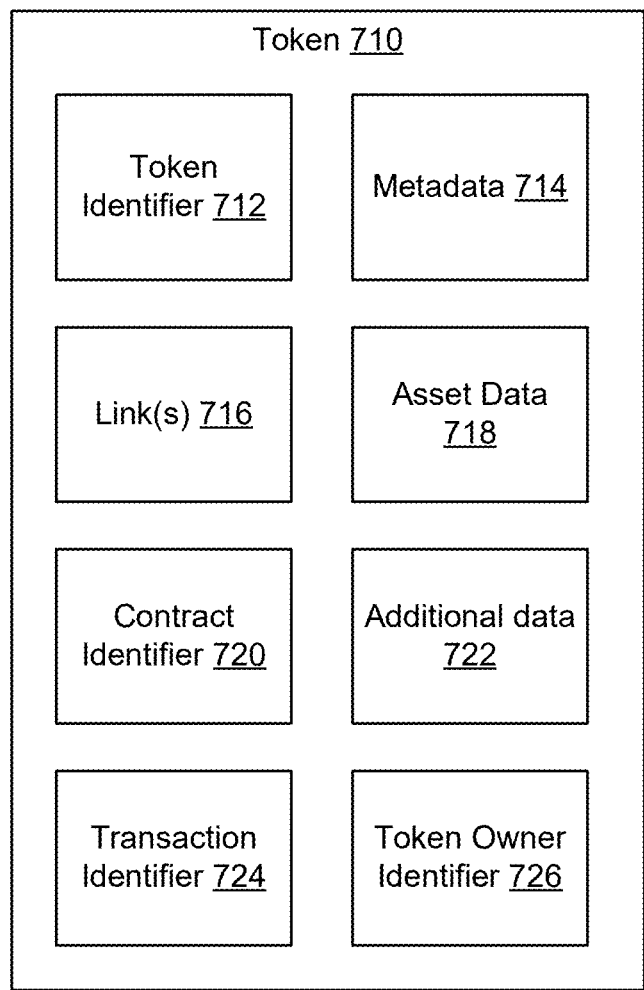
FIG. 7 illustrates an example of an implementation of a token, according to embodiments of the present disclosure.

FIG. 7 illustrates an example of an implementation of a token 710, according to embodiments of the present disclosure. The token 710 can be considered a data structure that at least associates an asset with ownership information and can be governed by a program code. With respect to an Ethereum blockchain, the program code can be a set of programs (e.g., software instructions) referred to as smart contracts that can be written in the smart contract language Solidity (see URL soliditylang.org). The smart contracts can execute of Ethereum virtual machine (EVM) computing nodes. Further, many existing smart contract programs, including NFT smart contracts, are available for use or modification from OpenZepplin (see URL openzeppelin-.com/contracts and github.com/OpenZeppelin/openzeppelin-contracts).

In some embodiments, the token 710 is a manifestation of interactions with a smart contract as recorded or chronicled on a notarized ledger as discussed above. Typically, interactions comprise transactions that are then encoded within the notarized ledger. The token 710, for example, can comprise a digital token, such as a ledger fungible token (such as a cryptographic currency token for a specific ledger), a ledger non-fungible token (such as an NFT for a specific ledger), a ledger composable token (such one including a set of tokens), a ledger set token (such as a token that is a member of a set), a ledger token collection (such as a collection of tokens bound together as a set), a ledger multi-part token (such as a token that includes multiple parts, each part being possibly another token), a ledger validation token (such as token used for validation), a ledger authentication token (such as a token used for authentication), a ledger semi-fungible token (such as a token that provides for some level of interaction with other types of tokens). In a particular example, an NFT that possibly adheres to the Ethereum NFT standard ERC-721 (see URL eips.ethereum.org/EIPS/eip-721), which defines a standardized API for tracking or transferring NFTs. More specifically, when the token 710 is or comprises an NFT, then the token 710 represents a non-fungible right to access the corresponding private data values.

Still, the token 710 could comprise or be a part of a multi-token set representing one or more rights. In such cases, more than one token 710 could be minted to provide rights to more than one entity. An acceptable standard for multi-token sets includes the Ethereum multi-token standard ERC-1155 (see URL eips.ethereum.org/EIPS/eip-1155). Yet further, the token 710 could comprise multiple sub-tokens or even part of a supra-token. Said differently, the token 710 could be a token that itself is made of other tokens or the token 710 could be an individual token combined with other to give rise to a new token. Each compound token and its individual component tokens could be NFTs. Ethereum Composable Non-Fungible Token Standard ERC-998 (see URL eips.ethereum.org/EIPS/eip-998) represents a possible composable token structure standard.

One familiar with Ethereum might wonder about use of a fungible token, possibly based on ERC-20 (see URL ethereum.org/en/developers/docs/standards/tokens/erc-20). ERC-20 outlines an interface through which one can create a set of tokens that are essentially indistinguishable from each other. Examples include skill points in a game, currency, a counter, or other types of fungible tokens. While it is technically possible to create a version of the token 710 that operates as a basis for fungible tokens, it is considered less preferable. One reason is an NFT or tokens having limited fungibility provide for high fidelity management of access rights. Each time a token owner obtains an NFT or uses the NFT, the corresponding transaction is recorded on the notarized ledger thereby creating an audit trail of who does what with the data and when. Fungible tokens are less trackable because it is not possible to tell the difference between one token and another. However, fungible tokens may operate as a currency within the TMP ecosystem. Disclosed services could be performed in exchange for a fee paid in the form of a corresponding fungible token.

Although the token 710 is illustrated as a single data construct, the token 710 is typically deployed as a token within the context of a smart contract. As such, the token 710 may be recorded on a notarized ledger as a transaction that adheres to the protocols, requirements, or standards of the target ledger technology and the smart contract as alluded to above. For example, the token 710 may be recorded on the Ethereum blockchain as a non-fungible token following an ERC-721 standard compliant smart contract interface. In which case, when the token 710 is minted (i.e., a minting transaction) as an NFT, the transaction of minting of the NFT is recorded on the notarized ledger rather than the token itself. Further, when such NFTs are transferred to a new owner, the transaction of the transfer is recorded on the notarized ledger. The purpose of recording the transaction in the ledger rather than storing the actual token on the ledger is to reduce the overall storage burden of the notarized ledger on the various participating nodes (e.g., virtual machines, computers, etc.) in the ledger. Still, it is possible to store the actual token data on the notarized ledger, but such storage incurs additional costs (e.g., transaction fees, etc.) and additional storage burden. Typically, the token data itself would be stored off ledger, on a web server, cloud-based system, or a remote file system for example. In such cases when the NFT transaction is recorded, the transaction may include a link such as URI, URL, hash address, or other link that points to where the token data resides on the network.

From an implementation perspective, the token 710 can be instantiated or otherwise created as a standalone data object. In some embodiments, the token 710 could be built according to one or more object-oriented class definitions, possibly in binary format in memory. Still, in more preferred embodiments, the token 710 can be serialized via a markup language so that the content of the token 710 can be digitally stored, transmitted, processed, or otherwise managed. For example, the token 710 can be created using XML, JSON, YMAL, or other type of markup language to encode the various features of the token 710. Thus, the token 710 can comprise a set of hierarchically organized sets of data for ease of reading or processing.

The token 710 is illustrated as having many features to support management via a corresponding notarized ledger as well as to support the above described functionalities. Several features include a token identifier 712, a token owner identifier 726, and possibly a token link 716. These specific features aid in managing the token 710 on the corresponding notarized ledger. One should appreciate that some of these features may change with time. For example, the token owner identifier 726 could change as a token owner transfers ownership of the token 710 to another owner.

The token identifier 712 typically is a data value or object that identifies a specific token 710 on the target notarized ledger. In some embodiments, the token identifier 712 comprises a unique identifier (e.g., GUID, UUID, URI, hash, SHA-256 hash, Keccak-256 hash, address, etc.), which may be a single value (e.g., a hash, a number, etc.) or multi-valued (e.g., JSON data set, instantiated class object, etc.). However, it is also possible the token identifier 712 could comprise other values as required or desired by the minter of the token (e.g., a name, a number, a place, etc.). For example, a data owner or operator could mint successive tokens simply using sequential token identifiers of 1, 2, 3, 4, and so on. Each token 710 they mint could be based on the applicable smart contract. Each time a token 710 is minted as an NFT, the token identifier can be incremented by 1. The token 710 would be identified by the smart contract name and incremented token identifier. For the purposes of this discussion, the reader may assume the token identifier 712 comprises a unique value so that the token 710 may be distinguished from other tokens on the ledger. Still, the reader should be aware that in some embodiments the token identifier 712 could be used to represent a token set (e.g., an ERC-998 token, ERC-1155 token, etc.).

The token identifier 712 could be generated algorithmically based on the content of the private data or other data associated with the token 710. For example, the token identifier 712 could be generated via execution of an implementation of a hash algorithm (e.g., SHA256, Keccek-256, MD5, etc.) on various data of the token 710 (e.g., such as a hash of the underlying asset and ownership information, etc.). This approach is considered advantageous because the resulting hash unifies the digital asset with the token. Such hashes can then be used at a future date during an audit or as a method of verifying the ownership of the underlying asset.

In a somewhat similar vein, the token owner identifier 726 is a data value that specifically, and preferably uniquely, identifies the current token owner of the token 710, possibly the entity creating the virtual token machines, token collections, or other objects in the ecosystem. When the token 710 is transferred to a new owner, then a corresponding transaction is recorded on the ledger with the updated the token owner identifier 726. Thus, the ledger chronicles the chain of custody of the token 710 from one transaction to another. For the Ethereum blockchain, a token owner identifier 726 would comprise an address of the token owner, which typically is the last or least significant 20 bytes of a hash (e.g., Keccak-256, etc.), and the public key of the new token owner. In many embodiments, the token identifier 712 and the token owner identifier 726 form a unique pair that represents the token, which can then be found on the corresponding notarized ledger. Thus, the ledger can also chronicle a chain of custody of the private data.

The token 710 can be considered the product of a smart contract (e.g., Ethereum Solidity contract, Solana Token Program, etc.). The token 710 may also include information related to the corresponding smart contract. Such information is represented by contract identifier 720. The contract identifier 720 enables the TMP to call back into the specific smart contract interfaces. While the contract identifier 720 typically is based on an address, an Ethereum contract address for example, it is also contemplated that the contract identifier 720 could also be other forms of addresses including a URL, URI, DOI, IPv4, IPv6, network addresses, internal APIs, or other types of address. Further, the contract identifier 720 can include or can point to additional information regarding the corresponding contract under which the token 710 is instantiated. For example, the prefix of a HOI could comprise the smart contract address while the suffix might point to a corresponding block or even to a corresponding API. Additionally, or alternatively to including contract identifier 720, the token 710 can include some or all of the data objects of a smart contract.

Asset data 718 and metadata 714 can also be included in the token. The asset data 718 can include or indicate one or more digital assets and/or one or more other tokens. The metadata 714 can indicate various properties of the underlying digital asset(s), such as its time and/or location of creation, the used tool, the used account, etc. The metadata 714 can also include a batch identifier to indicate that the token 710 is a member of a larger group of tokens. For example, a data owner may wish to make a collection of digital assets available to multiple parties of interest; collectible cards or game items. In such cases, the token 710 might be a member of a batch of tokens that include a token for each part. In such embodiments, one or more batch identifiers may be used for multi-token sets that may adhere to ERC-1155. The batch identifier may be considered optional in support of larger token management, possibly for a set of tokens forming a "series" release. For example, the batch identifier could comprise the name of the type of tokens, the name of an entity making the tokens, a sequence number indicating the request being serviced, or other types of identifiers. In a similar vein, the batch identifier may also represent a composable token according to ERC-998. Said in a different way, the batch identifier may include a root identifier that can be used for the set of individual tokens that compose the token 710.

Additional data 722 can also be in the token 710. For example, the additional data 722 can include parameters that control execution of certain aspects of a smart contract. Such parameters can indicate a time frame for royalty-free use, number of uses, authorized users, permitted uses, and the like. The additional data 722 can also include information that may be used to audit and/or verify the ownership of the token 710. For example, the additional data 722 can indicate when the token 710 was minted, a container unit that included the token, a virtual token machine that included the container unit, a physical location and/or a physical object associated with the virtual token machine, user context(s) and/or device context(s) associated with user interactions with the virtual token machine and/or the container unit, etc.

A transaction identifier 724 can also be included in the token 710 and represents an identifier associated with any transactions associated with the token 710. Typically, such identifiers would likely be stored on the ledger and may be a hash value or derived from a hash value associated with the token 710 or a corresponding block in which the token 710 transaction resides. For example, the transaction identifier 724 can could comprise a ledger block identifier portion and a specific transaction identifier portion within the block.

The link(s) 716 may also be associated with the token 710. The link(s) 716 also provides a mechanism by which the token 710 may be coupled with external data. Typically, say for ERC-721 NFTs on the Ethereum blockchain infrastructure for example, the link(s) 716 may be stored on the ledger itself along with or in the corresponding transaction where the link comprises a URI (e.g., URL, HOI, DOI, etc.). Thus, the transaction as recorded can point to other data such as, for example, data stored off the ledger. In more preferred embodiments, the link(s) 716 is a link to a more permanent or secured network storage device where additional data (e.g., audio, images, video, executables, games, text, etc.) can be found and accessed upon authentication.

FIG. 8 illustrates an example of a flow for associating a token with a user account, according to embodiments of the present disclosure. The flow includes a set of operations that may be implemented as part of program code that is stored in at least one computer-readable memory of a computer system (e.g., the computer system 210 of FIG. 2) and executed by at least one processor of the computer system. Although the operations are illustrated in a particular order, the order can be changed and/or some of the operations can be omitted. Some of the operations may be executed multiple times. Particular operations are described in association information stored in one or more databases. Different database and/or storage technologies are possible, including ledger, IPFS; look-up tables, SQL, search tree (e.g., Knn, etc.) technologies, or other data indexing techniques.

In an example, the flow includes operation 802, where the computer system obtains a context of a user and/or a user device. The user may operate the user device and login to a user account associated with a user service of the computer system. The user service can relate to presenting a virtual token machine (e.g., gashapon machine, capsule vending machine, etc.) from which tokens can be obtained. The presentation of the virtual token machine is possible in an AR session upon an execution of an application on the user device, where this application interfaces with the user service of the computer system. The context can include one or more user contexts, one or more device contexts, or other related contexts. The user context can be determined from the user account and can include, for example, a user preference, a user history of interactions with virtual token machines, a subscription to the user service, an identifier of a group to which the user belongs, etc. the device context can determine from data received from the device and can include, among other things, a device location of the user device (e.g., a real-world location such as particular coordinates, particular address, particular area or cell, or any other identifier of a physical location in the real world), a type of the user device, a type of the user device's operating system, a type of the application executing on the device, A QR code scan, a barcode scan, image data, etc. In an example, at least the device location is obtained. Contexts may be defined based on one or more criterion that are satisfies by values of user attributes, device attributes, environment attributes, or other attributes associated with a user. For example, the value of such attributes may be determined by one or more sensors associated with a user device (e.g., microphone, camera, GPS, IMU, user inputs, etc.).

In an example, the flow includes operation 804, where the computer system identifies a set of virtual object container rule sets. This set can be identified from at least one container database storing virtual object container rule sets indexed by a number of factors, such as any or a combination of possible user context attributes and/or device context attributes including at least location-based attributes (e.g., GPS coordinates, longitude, latitude, S2 cell identifiers, geofence attributes, zip codes, address, Google plus codes, altitude, etc.). The set can be identified by querying the database using the user contexts and/or device contexts. In the use case of the device location, rule sets in the set of virtual object container rule sets have a location-based attribute satisfying at least one location-dependent criterion that operates based on the device location. In particular, these rules are applicable to the device location by being associated with a physical location that is within a threshold proximity (e.g., in distance and/or direction, boundary, halo around an area, etc.) to the device location. Other selection criteria are possible and generally relate to matching the user contexts and/or device contexts with factors used in the indexing. The query result can include a set having zero elements. This result indicates a NULL, whereby there is nothing indexed based on the user contexts and/or device contexts. Of course, the set can include one or more elements. If more than one rules are identified and overlap, the query result can include all these rules or the overlap or intersection between the identified rules.

In an example, the flow includes operation 806, where the computer system obtains content selection criteria based on the context. As explained herein above, the content can include one or more user contexts, or one or more device contexts, or triggering contexts. The content selection criteria here are usable to determine virtual objects that can be shown in the AR session as part of an AR virtual object container (e.g., the container units to be shown in a virtual token machine). For example, based on a user preference or a user mission, a particular type of virtual object collections is identified. The mission can be a shopping mission, a play mission, etc. and can be indicated by the application executing on the device or based on other contextual data (e.g., by the device location being near a physical store, by a group game being instantiated where each user of a group is to obtain tokens, etc.).

In an example, the flow includes operation 808, where the computer system identifies second virtual object information. The second virtual object information can control the presentation of the container units and/or the type tokens associated with the container units (e.g., balls, capsules, boxes, presents, etc.). The second virtual object information can be identified from at least one virtual object database that stores first virtual object information, whereby the second virtual object information is a subset of the first virtual object information. Generally, the identified virtual object information satisfies the content selection criteria. In particular, a query can be submitted to the virtual object database and can identify some or all of the attributes of the context (including possibly the device location) that meet the content selection criteria (including a criterion for a location-based selection). The query result can be returned based on matching these attributes with entries corresponding to the second virtual object information.

In an example, the flow includes operation 810, where the computer system causes the user device to instantiate an AR object container; a virtual AR gashapon machine, a vending machine, for example. The AR object container can be a virtual token machine and can be instantiated on or for the user device according to at least one rule set in the identified set of virtual container object rule sets. In one example, the AR object container is instantiated on the computer system and the application executing on the user device receives data and presentation command to present the AR object container. In another example, the computer system sends program code for the AR object container to the user device and the application executing on the user devices instantiates the AR object container by using the program code.

In an example, the flow includes operation 812, where the computer system causes the user device to instantiate a collection of virtual objects within the instantiated AR virtual object container. The collection can be a set of container units and can be instantiated according to the second virtual object information and to at least one rule set in the identified set of virtual object container rule sets; for example, according to a deterministic or random rule set. Each container unit can be associated with one or more tokens in the virtual object database. In an example, the collection is instantiated on the computer system and the application executing on the user device receives data and presentation command to present the collection in an AR object container. In another example, the computer system sends program code for the collection to the user device and the application executing on the user devices instantiates the collection by using the program code. In both examples, the second virtual object information indicates the number of container units to present, the presentation styles across and for each container unit, the sequence of dispensing the container units, the state of each container unit, etc.

In an example, the flow includes operation 814, where the computer system enables the user device to initiate a record. The record can be initiated based on a user interaction with the AR virtual object container and can store information about the user interaction and the result (e.g., the dispensing of a virtual object, the revealing of a token, etc.). In an example, the user device is enabled to initiate a notarized ledger transaction associated with at least one virtual object in the collection of virtual objects while at least one location-dependent criterion remains satisfied. For example, as long as the device is within a threshold proximity to the physical location, the user interaction to dispense a container unit and/or to open a container unit is enabled. Upon such interaction, the user device can send corresponding interaction data to the computer system that then causes the record to be generated by interfacing with a transaction system and/or the device itself can cause this record to be generated by interfacing with the transaction system.

FIG. 9 illustrates an example of another flow for associating a token with a user account, according to embodiments of the present disclosure. The flow includes a set of operations that may be implemented as part of program code that is stored in at least one computer readable memory of a user device (e.g., the computer system 210 of FIG. 2) and executed by at least one processor of the user device. Although the operations are illustrated in a particular order, the order can be changed and/or some of the operations can be omitted. Some of the operations may be executed multiple times. Particular operations are described in association information stored in one or more databases.

In an example, the flow includes operation 902, where the user device requests, from a computer system, instantiation of an AR virtual object container. For example, the user device can be executing an application configured to present an AR session. The application can include a selectable option to present the AR virtual object container, which may be a virtual token machine, possibly an AR gashapon machine, in the AR session. Based on a user interaction (e.g., via a GUI of the user device and/or natural language speech detected by the user device) with the selectable option, the user device can send the request. Additionally, or alternatively, the application can store physical location information corresponding to AR virtual object containers and, upon detecting that the device location is within a proximity threshold to one of such AR virtual object container, the request can be made automatically or upon a presentation and user selection of the selectable option and can identify the device's physical location. Non-location-based triggers are possible, such as, for example, a QR code scan and/or barcode scan that results in sending the request that includes some or all of the scanned data. Another example includes object detection, where the request can be sent and can include image data generated by the user device.

In an example, the flow includes operation 904, where the user device sends a context to the computer system or attribute and values by which the computer system may derive a context. The context can be sent along with or included in the request and can be one or more of a user context and a device context (including at least the device location).

In an example, the flow includes operation 906, where the user device receives, from the computer system, virtual object container information. As described in connection with FIG. 8, the computer system can determine at least a rule set controlling the presentation of the AR virtual object. Here, the computer system can send at least the rule set to the user device along with program code for instantiating the AR virtual object container. Or the computer system can instantiate the AR virtual object according to the rule set and send a result of the instantiation to the user device.

In an example, the flow includes operation 908, where the user device receives, from the computer system, virtual object information. As described in connection with FIG. 8, the computer system can determine such information from a virtual object database. Here, the computer system can send this information to the user device along with program code for instantiating the virtual objects, each of which can be a container unit and can be associated with one or more token. Or the computer system can instantiate the virtual objects and send a result of the instantiation to the user device.

In an example, the flow includes operation 910, where the user device presents the AR virtual object and the virtual objects. The application executing on the device can instantiate the present the AR virtual object and the virtual objects and/or can present the information received from the computer system, where the instantiations are on the computer system.

In an example, the flow includes operation 912, where the user device receives user interaction. The user interaction can be with the AR virtual object container via the GUI or can correspond to natural speech input that can be processed locally at the user device or remotely therefrom to determine the user interaction. In the use case of remote instantiations, information about the user interaction is sent to the computer system that, in turn, updates its own virtual object container information and virtual object information and returns updated presentation information. In the use case of local instantiations, information about the user interaction is processed by the user device that, in turn, updates its own copy of the virtual object container information and virtual object information, determines the updated presentation information, and synchronizes its updates with the computer system.

In an example, the flow includes operation 914, where the user device updates the presentation of the AR virtual object and the virtual objects. For example, the updated presentation information is shown in the AR session. If the user interaction was to obtain a virtual object (e.g., to dispense a container unit, present a container unit, etc.), the AR session shows this obtaining. If the user interaction was to reveal a token, the AR session shows this revealing. States associated with the virtual token machine, container unit, token, or other objects may also be updated through transmitting the transactions to the computer system.

In an example, the flow includes operation 916, where the user device initiates a record. The record can store information about the user interaction and the result (e.g., the obtaining of a virtual object, the revealing of a token, etc.). The result can correspond to a transaction that includes a purchase, a transfer, an addition to a collection, an activation of a token, an addition to a wallet, or other interaction. Of course, similar techniques can be used herein to perform other types of actions in the AR session, such as by interacting with the AR virtual object container or another AR object, where the user device can initiate a record too. Such actions can relate to a trade, an offer to sell, a burn, a deactivation, a removal from the wallet, a sale, a return, etc. In an example, the user device initiates a notarized ledger transaction associated with at least one virtual object in the collection of virtual objects while at least one location-dependent criterion remain satisfied. For example, as long as the device is within a threshold proximity to the physical location, the user interaction to dispense a container unit and/or to open a container unit is enabled. Upon such interaction, the user device can send corresponding interaction data to the computer system that then causes the record to be generated by interfacing with a transaction system and/or the device itself can cause this record to be generated by interfacing with the transaction system. The notarized ledger can include at least one of the following: a private ledger, a public ledger, a centralized ledger, a semi-centralized ledger, a blockchain ledger, a cryptocurrency ledger, a hashgraph, a torrent ledger, a permissionless ledger, a permissioned ledger, a directed acyclic graph ledger, or an immutable ledger. A transaction can also include a cryptocurrency transaction, whereby a wallet can be updated and a cryptography currency can be used for an exchange such as to obtain an NFT. In an example, the transaction can be a fiat currency transaction.

Figure 10:
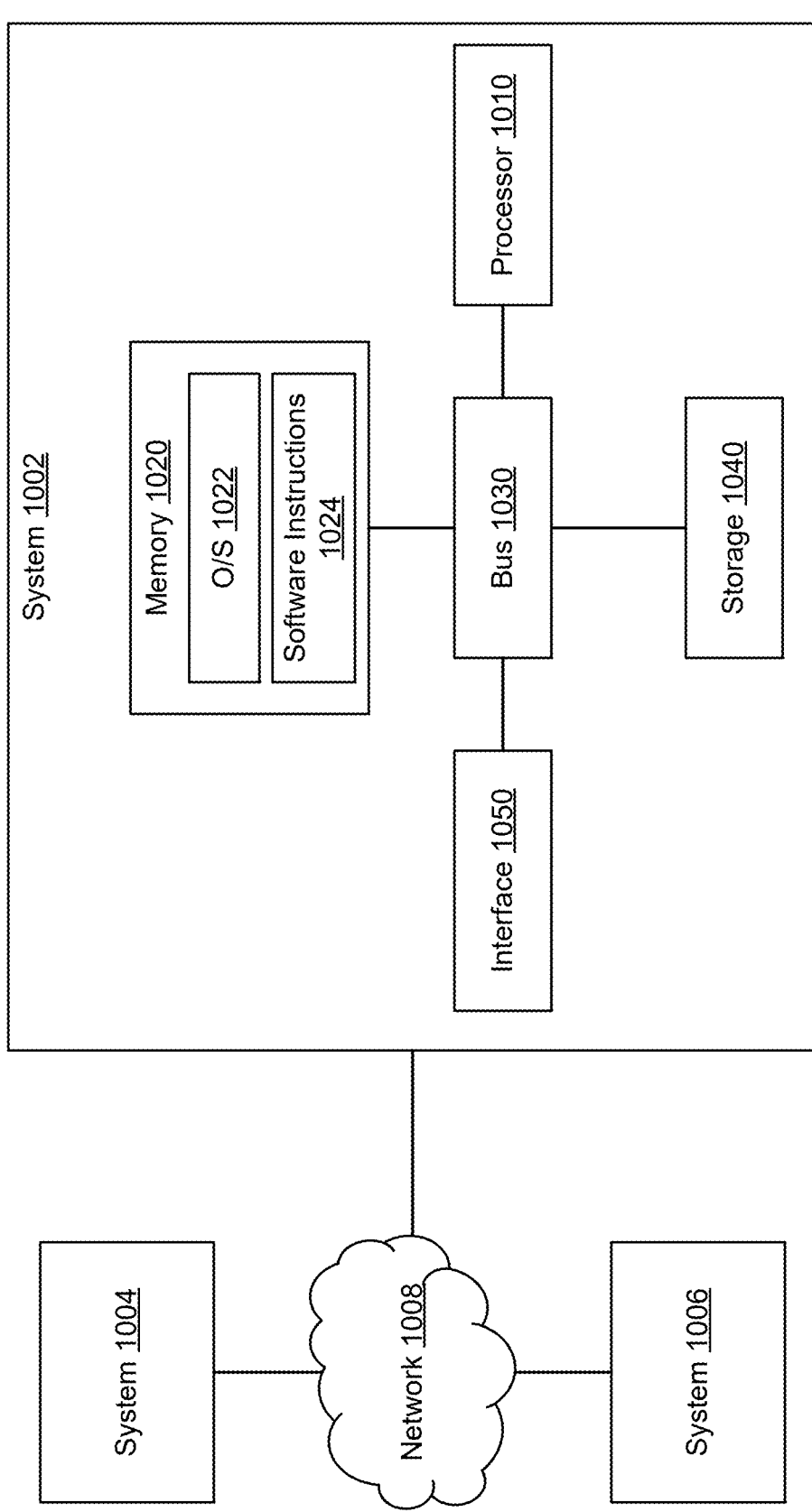
FIG. 10 is block diagram of a distributed computer system usable to implement embodiments of the present disclosure.

FIG. 10 is block diagram of a distributed computer system 1000 usable to implement embodiments of the present disclosure. Various aspects and functions described herein may be implemented as hardware, software executing on hardware, or a combination of hardware and software executing on one or more computer systems. Aspects in accord with the present disclosure may be located on a single computer system or may be distributed among one or more computer systems connected to one or more communication networks.

For example, various aspects and functions may be distributed among one or more computer systems configured to provide a service to one or more client computers, or to perform an overall task as part of a distributed system.

Additionally, aspects may be performed on a client-server or multi-tier system that includes components distributed among one or more server systems that perform various functions.

The distributed computer system 1000 of FIG. 10 includes three computer systems 1002, 1004 and 1006 (although a different number of computer systems is possible). The computer systems 1002, 1004, 1006 can be operated by different entities and/or can be computing nodes of a blockchain network. As shown, the computer systems 1002, 1004 and 1006 are interconnected by, and may exchange data through, a communication network 1008. The network 1008 may include any communication network through which computer systems may exchange data. To exchange data via the network 1008, the computer systems 1002, 1004, and 1006 and the network 1008 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA IIOP, RMI, DCOM and Web Services. The communication network may further employ one or more mobile access technologies including 2nd (2G), 3rd (3G), 4th (4G), 5th (5G) generation radio access for cellular systems, WLAN, Wireless Router (WR) mesh, and other communication technologies. Access technologies such as 2G, 3G, 4G and LTE and future access networks may enable wide area coverage for mobile devices.

Computer systems 1002, 1004 and 1006 may include clients and servers. In various embodiments, to ensure data transfer is secure, the computer systems 1002, 1004 and 1006 may transmit data via the network 1008 using a variety of security measures including TSL, SSL or VPN, among other security techniques.

Various aspects and functions may be implemented as specialized hardware or software executing in one or more computer systems including the computer system 1002 shown in FIG. 10. As depicted, the computer system 1002 includes a processor 1010, a memory 1020, a bus 1030, an interface 1050 and a storage system 1040. The processor 1010, which may include one or more microprocessors or other types of controllers, can perform a series of instructions that manipulate data. As shown, the processor 1010 is connected to other system placements, including a memory 1020, by the bus 1030.

The memory 1020 may be used for storing programs and data during operation of the computer system 1002. Thus, the memory 1020 may be a relatively high performance, volatile, random access memory such as a dynamic random access memory (DRAM) or static memory (SRAM). However, the memory 1020 may include any device for storing data, such as a disk drive or other non-volatile storage device, such as flash memory or phase-change memory (PCM). Various embodiments in accord with the present disclosure can organize the memory 1020 into particularized and, in some cases, unique structures to perform the aspects and functions disclosed herein. The memory 1020 may store program code of an operating system 1022 and software instructions 1024 for a TMP.

Components of the computer system 1002 may be coupled by an interconnection element such as the bus 1030. The bus 1030 may include one or more physical busses (for example, busses between components that are integrated within a same machine) and may include any communication coupling between system placements including specialized or standard computing bus technologies such as IDE, SCSI, PCI and InfiniBand. Thus, the bus 1030 enables communications (for example, data and instructions) to be exchanged between system components of the computer system 1002.

Computer system 1002 also includes one or more interfaces 1050 such as input devices, output devices and combination input/output devices. The interface devices 1050 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 1050 allow the computer system 1002 to exchange information and communicate with external entities, such as users and other systems.

Storage system 1040 may include a computer-readable and computer-writeable nonvolatile storage medium in which instructions are stored that define a program to be executed by the processor. The storage system 1040 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 1010 or some other controller may cause data to be read from the nonvolatile recording medium into another memory, such as the memory 1020, that allows for faster access to the information by the processor 1010 than does the storage medium included in the storage system 1040. The memory may be located in the storage system 1040 or in the memory 1020. The processor 1010 may manipulate the data within the memory 1020, and then copy the data to the medium associated with the storage system 1040 after processing is completed. A variety of components may manage data movement between the medium and the memory 1020, and the disclosure is not limited thereto.

Further, embodiments of the present disclosure are not limited to a particular memory system or storage system. Although the computer system 1002 is shown by way of example as one type of computer system upon which various aspects and functions in accord with the present disclosure may be practiced, aspects of the disclosure are not limited to being implemented on the computer system. Various aspects and functions in accord with the present disclosure may be practiced on one or more computers having different architectures or components than that shown in FIG. 10. For instance, the computer system 1002 may include specially-programmed, special-purpose hardware, such as, for example, an application-specific integrated circuit (ASIC) tailored to perform a particular operation disclosed herein. Another embodiment may perform the same function using several general-purpose computing devices running the operating system 1022.

The operating system 1022 may manage at least a portion of the hardware placements included in computer system 1002. A processor or controller, such as processor 1010, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

In various embodiments, processor 1010 and operating system 1022 together define a computing platform for which application programs in high-level programming languages may be written. These component applications may be executable, intermediate (for example, C# or JAVA byte-code) or interpreted code which communicate over a communication network (for example, the Internet) using a communication protocol (for example, TCP/IP). Similarly, functions in accord with aspects of the present disclosure may be implemented using an object-oriented programming language, such as JAVA, C++, or C # (C-Sharp), among others. Other object-oriented programming languages may also be used. Alternatively, procedural, scripting, or logical programming languages may be used.

Additionally, various functions in accord with aspects of the present disclosure may be implemented in a non-programmed environment (for example, documents created in HTML, XML or other format that, when viewed in a window of a browser program, render aspects of a graphical-user interface or perform other functions). Further, various embodiments of the present disclosure may be implemented as programmed or non-programmed placements, or any combination thereof.

According to embodiments of the present disclosure, a computer-based digital content delivery management system is described. The computer-based digital content delivery management system includes at least one container database storing virtual object container rule sets indexed by at least location-based attributes, at least one virtual object database storing first virtual object information, and at least one content server coupled with at least one container database. The content server is enabled to perform at least the following operations upon execution of software instruction stored in a computer readable memory: obtaining a device location of a user device, identifying a set of virtual object container rule sets from at least one container database, wherein rule sets in the set of virtual object container rule sets have a location-based attribute satisfying at least one location-dependent criterion that operates based on the device location, obtaining content selection criteria based on a context of the user device, identifying second virtual object information from at least one virtual object database wherein the second virtual object information satisfies the content selection criteria, causing the user device to instantiate an augmented reality (AR) virtual object container on or for the user device according to at least one rule set in the identified set of virtual object container rule sets, causing the user device to instantiate a collection of virtual objects within the instantiated AR virtual object container according to the second virtual object information and to at least one rule set in the identified set of virtual object container rule sets, and enabling, according to at least one rule set in the identified set of virtual object container rule sets, the user device to initiate a notarized ledger transaction associated with at least one virtual object in the collection of virtual objects while at least one location-dependent criterion remain satisfied.

According to embodiments of the present disclosure, a method is described. The method includes: obtaining a device location of a user device, identifying a set of virtual object container rule sets from at least one container database storing virtual object container rule sets indexed by at least location-based attributes, wherein rule sets in the set of virtual object container rule sets have a location-based attribute satisfying at least one location-dependent criterion that operates based on the device location, obtaining content selection criteria based on a context of the user device, identifying second virtual object information from at least one virtual object database storing first virtual object information, wherein the second virtual object information satisfies the content selection criteria, causing the user device to instantiate an augmented reality (AR) virtual object container on or for the user device according to at least one rule set in the identified set of virtual container object rule sets, causing the user device to instantiate a collection of virtual objects within the instantiated AR virtual object container according to the second virtual object information and to at least one rule set in the identified set of virtual object container rule sets, and enabling, according to at least one rule set in the identified set of virtual object container rule sets, the user device to initiate a notarized ledger transaction associated with at least one virtual object in the collection of virtual objects while at least one location-dependent criterion remain satisfied.

According to embodiments of the present disclosure, a non-transitory computer-storage medium is described. The non-transitory computer-storage medium stores instructions that, upon execution on a system, cause the system to perform operations. The operations include: obtaining a device location of a user device, identifying a set of virtual object container rule sets from at least one container database storing virtual object container rule sets indexed by at least location-based attributes, wherein rule sets in the set of virtual object container rule sets have a location-based attribute satisfying at least one location-dependent criterion that operates based on the device location, obtaining content selection criteria based on a context of the user device, identifying second virtual object information from at least one virtual object database storing first virtual object information, wherein the second virtual object information satisfies the content selection criteria, causing the user device to instantiate an augmented reality (AR) virtual object container on or for the user device according to at least one rule set in the identified set of virtual container object rule sets, causing the user device to instantiate a collection of virtual objects within the instantiated AR virtual object container according to the second virtual object information and to at least one rule set in the identified set of virtual object container rule sets, and enabling, according to the to at least one rule set in the identified set of virtual object container rule sets, the user device to initiate a notarized ledger transaction associated with at least one virtual object in the collection of virtual objects while at least one location-dependent criterion remain satisfied.

According to embodiments of the present disclosure, a user device is described. The user device includes one or more processors and one or more memory storing instructions that, upon execution by the one or more processors, configure the user device to perform operations. The operations include sending a request to a system to present an augmented reality (AR) virtual object container in an AR session, receiving from the system virtual object container information and virtual object information based at least in part on a context associated with the user device, presenting the AR virtual object container in the AR session based at least in part on the virtual object container information, presenting virtual objects as being contained in the AR virtual object container in the AR session, enable a user interaction with at least one of the AR virtual object or a virtual object of the virtual objects, and record a transaction associated with the user interaction. The virtual object container information and virtual object information can be stored in respective databased by the system.

According to embodiments of the present disclosure, a method is described. The method can be implemented on a user device to perform operations. The operations include sending a request to a system to present an augmented reality (AR) virtual object container in an AR session, receiving from the system virtual object container information and virtual object information based at least in part on a context associated with the user device, presenting the AR virtual object container in the AR session based at least in part on the virtual object container information, presenting virtual objects as being contained in the AR virtual object container in the AR session, enable a user interaction with at least one of the AR virtual object or a virtual object of the virtual objects, and record a transaction associated with the user interaction. The virtual object container information and virtual object information can be stored in respective databased by the system.

According to embodiments of the present disclosure, a non-transitory computer-storage medium is described. The non-transitory computer-storage medium stores instructions, that upon execution on a user device, cause the user device to perform operations. The operations include sending a request to a system to present an augmented reality (AR) virtual object container in an AR session, receiving from the system virtual object container information and virtual object information based at least in part on a context associated with the user device, presenting the AR virtual object container in the AR session based at least in part on the virtual object container information, presenting virtual objects as being contained in the AR virtual object container in the AR session, enable a user interaction with at least one of the AR virtual object or a virtual object of the virtual objects, and record a transaction associated with the user interaction. The virtual object container information and virtual object information can be stored in respective databased by the system.

The above discussion presents the inventive subject matter from a technical perspective. The following discussion presents the inventive subject matter from a deployment perspective where a large chain store engages with the ecosystem. One should appreciate the following capabilities may be implemented as a for-fee service.

As an example, consider a scenario where a nationwide retail chain (e.g., Target®, WalMart®, Disney®, etc.) wishes to engage with the herein described NFT management ecosystem. In this example, the chain may create a series of collectible digital tokens, NFTs in this case, which they wish to vend to consumers via AR gashapon machines located at their stores or at specific locations within their stores. The chain's campaign may begin by an operator logging into the operator account and creating a campaign. A campaign may be assigned a campaign identifier, which may be used by the operator to track or to monitor the progress of the campaign. The campaign identifier could comprise a simple name or number, a UUID, a GUID, or other value that may be used to reference the campaign. For example, as the operator of the campaign continues to work, the service may present campaign-specific information (e.g., number of NFTs, number of machines, revenue generated, machine locations, campaign name, inventory pool, machine inventories, etc.) via one or more on-line dashboards.

The operator may proceed further with developing the campaign through selection of one or more underlying notarized ledger technologies. The ledger may be selected based on various requirements. For example, a well-established ledger (e.g., Ethereum, etc.) that has relatively high gas costs may be selected in cases where the chain may expect low volume, but high value NFTs to be used. In other cases, the operator may select a ledger (e.g., Wax, Solana, etc.) that supports high volume, low to no gas fees. While existing notarized ledger infrastructure may be selected, it is also possible for the service to provide a private notarized ledger for use by the campaign if so desired. For the sake of discussion, assume the chain wishes to create and vend a massive amount of NFTs, so they may select a notarized ledger supporting high volume, low gas fees. In response to selection of a notarized ledger, the service may present the operator with example or template smart contacts for use with the selected notarized ledger.

The operator may flesh out the smart contract interfaces as necessary to fit the requirements of the campaign. While the smart contract interfaces may support typical minting, transfers, burning or other basic NFT transactions, the smart contract interfaces can be further instrumented to handle royalty payments (e.g., cryptocurrency, fiat currency, etc.) to the retail chain's accounts or to artists that contribute to the NFT artwork. Further, the smart contracts may be provisioned with additional functionality to give rise to further utility of the NFTs beyond presenting some form of digital artwork. For example, the smart contract interfaces may support utility features possibly including unlocking special promotions, providing coupons, engaging membership services, gaining access to VIP events, granting on-line permissions, engaging in computer game play, redeeming for real world object or product, or other forms of utility.

The operator may also define the nature of their desired AR gashapon machines. While the AR virtual token machines can take on nearly any form, for the current sake of discussion the AR virtual token machines can be consider AR gashapon machines that vend prizes with capsules (see FIG. 3, for example). In some embodiments, the AR gashapon machines may be already created and available for use via a leasing program. For example, the NFT management service may create a set of gashapon machines that are in fact NFTs that may be leased under the terms of a machine's smart contract. Such an approach is considered advantageous because it provides for digitally tracking the use of the machines in the ecosystem and provides for ensuring the machines are in fact legitimate. Still, in other embodiments, the machines may be created by the operator according to the machine management functionality provided. While there are technical advantages (e.g., tracking, auditability, etc.) for creating gashapon machines that are NFTs, it is not necessary. Regardless, the machines may be instantiated as an AR object via a corresponding machine class that may then be rendered by a mobile phone application.

For a large retail chain having thousands of retail stores, the operator may require thousands of machines so that there may be at least one machine for each store. All the machines, or each individual machine, may be customized by updating the graphic textures, animations, sounds, or other AR presentation modalities. Further the operator, via one or more dashboard tools, may assign an AR gashapon machine to each retail site. This may be performed automatically. For example, the operator may provide the service with a CSV file listing the addresses of all the active retail stores. The service in response may convert the addresses to geo-location coordinates, geo fence areas, S2 cells identifiers, or other location addresses. Each machine may then be assigned a corresponding location address, thereby binding the machine to a store. In this example, individual machines are assigned to a store location. However, it is also possible that a single machine instance may be assigned to all store locations so that all stores share the same machine and corresponding inventory, and all consumer engage with the same machine, possibly in a deterministic fashion.

The operator may also decide to define the nature of the capsules that contain the NFTs. In some cases, the capsules may be generic or default capsules. However, in other cases, the operator may choose to customize the capsule containers to fit their campaign needs. For example, the capsules could be branded according to the retail chain's policies via assigning one or more graphic textures to the AR capsule models. Still, the operator may also seek to monetize the capsules by offering 3rd parties the ability to provide advertisements on or associated with the capsules. In exchange for a fee, the capsules may be textured with the 3rd party logos, audio messages, animations, text messages, or other branded information.

The total number of capsule models may vary depending on the campaign requirements. It may be sufficient to define a single capsule, which may be used for all NFTs. However, in more interesting implementations, the operator may define a set of capsules, say capsule models having five different colors for example, that may be randomly selected when a user engages with an AR gashapon machine. Still further, capsules may be defined as NFTs so that they may be tracked individually via their underlying container smart contracts. Thus, the operator may define the number of capsule types, the total number of capsules (e.g., nominally one capsule per NFT), rules governing the behavior of the capsules, capsule AR behaviors, or other capsule features.

While a typical implementation would leverage capsules or other container unit to improve the user's experience and better align with real-world gashapon machines, it is also possible that an implementation might not use capsules or container units at all. In such cases, the digital tokens may be vended directly to the user without a container unit.

The operator may be offered numerous tools by which they may create their NFTs. For example, the operator can leverage one or more procedural generation tools that allow the NFTs to be created randomly according to one or more probability table by building up the NFT from image primitives. Image primitives may include a background, a foreground, a character, a mouth, an eye, an ear, an item of clothing, a weapon, or other image primitives. When stacked together, they may form a final image to be minted as an NFT. The primitives may support a total possible combination space capable of yielding vast numbers of images, even beyond $1 \times 10^{16}$ or more unique digital tokens. Additionally, the operator may choose to create their digital tokens from original artwork or other digital information. Additional techniques for generating image-based NFTs include GANs, Stable Diffusion, AI tools (e.g., Creator NightCafe Studio, see URL creator.nightcafe.studio; DALL-E 2, see URL openai.com/dall-e-2/; etc.).

While the system supports creating digital token sets based on rarity (e.g., ERC-1155 like tokens), composable tokens (e.g., ERC-998 like tokens), or other types of digital tokens, for the sake of this discussion, assume the operator chooses to create ERC-721 like unique NFTs for the campaign. In view the campaign requires supplying thousands of machines, the operator may choose to create several million unique NFTs using the procedural generation tools where each NFT is selected from a vast combinatoric space. The operator may also enforce uniqueness rules to ensure that no two digital tokens are too similar. The collection of the several million NFTs may be part of a single release, series, season, or event; a holiday release for example.

When or as the digital tokens are created, they system may mint the digital tokens as full NFTs on the notarized ledger according to the corresponding smart contracts. As each token is minted (and paying any associated gas fees if necessary), the newly minted NFTs may be assigned to the operator's account wallet, thereby indicating the retail chain is now the owner of the NFTs. Alternatively, the minted NFTs may be escrowed with the service until they are actually vended to consumers. Thus, the inventive subject matter is considered to include the system operating as a digital token escrow service.

The operator may further define the NFT inventory rules for the machines. One or more default inventory rules may be made available. For example, the several million NFTs may be randomly distributed, preferably in a deterministic fashion, across all the AR gashapon machines. Consider a case where the AR gashapon machines are able to store 100 capsules. In view there are thousands of machines, there may be a pool of several thousand NFTs assigned to a single machine. The machine's pool may then be used to replenish the machine when it is empty or according to the machine's inventory rules. In other scenarios, the entire pool of several million NFTs may form a single inventory set used to populate all the machines so that no one machine becomes empty. In more preferred embodiments, the pools may be ordered for vending according to deterministic functions to ensure equity in game play. Still further, the operator may generate their own inventory or replenishment program code as desired.

Once the operator is ready, they may instruct the system to deploy the campaign by activating all machines or otherwise making them available for public consumption via the end consumer's mobile smart phone. The consumers may access the AR gashapon machines via a corresponding application that interfaces via one or more APIs to the backend services. The application may be an application customized for the retail chain, an application specific to the campaign, or other application suitably provisioned for accessing the NFT location-based management services.

A consumer may engage with the retail chain's AR gashapon campaign via their cell phone. In this example use case, as a consumer enters a store location where one of the AR gashapon machine is deployed, the AR gashapon application may cause the user's phone to vibrate or otherwise generate a notification that the machine is nearby. For example, the backend service may populate the user's application with nearby machines based on the current location of the user's cell phone. When the user's cell phone's location satisfies location criteria (e.g., near a geofence, in a geo fence area, having the same or similar S2 cell identifier, zip code, etc.), the notification may be generated.

The user may then open the application, which may capture a digital video of the environment. Subject to the campaign rules defined by the operator, the application may display one or more AR markers on the display superimposed on the video of the real-world scene where the markers indicates where the machine may be actually located. This approach provides for a "hot and cold" style game play. For example, the campaign designer could create a scavenger hunt by which the consumer may be directed about a store to various desirable locations before actually finding the AR machine.

Once the AR gashapon machine is found, the AR gashapon machine may be automatically anchored on a recognizable object or feature (e.g., display, product, logo, bar code, QR code, surface, shelf, etc.) at the real-world location. Still, the application may permit the user to place or anchor the AR gashapon in the scene. Thus, the AR gashapon machine may be rendered or otherwise presented in an augmented reality session within the application running on the user's mobile device.

Via the application, the user may purchase one or more spins, sometimes call pulls, of the AR gashapon machine's dial in exchange for fiat currency, tokens, cryptocurrency, or other exchange item. In response to the spin of the dial, the AR gashapon machine may vend an AR capsule containing an NFT. Typically, the NFT would not be revealed until the capsule is opened by the user. The capsule can remain closed until one or more opening conditions are met or satisfied. The opening conditions could be defined based on user interactions, time, location, user actions, actions of multiple users, game play events, or other factors as desired. For example, for a holiday promotion, the capsules may not open until the holiday arrives.

The capsule and/or NFTs, once purchased, may then be assigned to the user's wallet or account via a corresponding transaction recorded on the notarized ledger. The user can then be considered to own the capsule and/or NFTs. Further the user may also engage with these digital constructs via one or more other notarized ledger interactions including selling, trading, buying, exchanging, burning, or other interactions supported by the campaign's smart contracts.

The application may also engage with the AR gashapon in other ways as well. For example, the application can indicate if additional information about the machine is available. Machine information can include its identifier, number of NFTs vended, number of NFTs available, time information about the campaign, leader board information, NFT vending probabilities, NFT campaign probabilities, or other information that may be useful to the end consumer.

There are multiple variations possible on the above theme as well. Of particular note, the AR gashapon machines, the capsules, the inventory, and the NFTs can all be distinct manageable objects. Thus, a machine could be provisioned with a different inventory based on various factors. For example, a user context (e.g., user attributes, actions, etc.), may be used to select which inventory should populate the machine. One should appreciate that each type of object (e.g., machine, capsules, inventory, NFTs, etc.) may be controlled individually and combined together at a point of interact, possibly in real-time, with the user. Such an approach is considered advantageous because it provides for creating highly customized, personalized user experiences.

Deterministic game play is considered more preferable over raw random gameplay. In view the vended digital tokens could have rarity (e.g., common, uncommon, rare, ultra-rare, unique, legendary, NFTs, etc.), the digital tokens may have value in a secondary market. In which case, users will want to be informed of the probabilities of obtaining "rare" or valuable tokens. Providing deterministic and auditable gameplay engenders user trust and reduces the risk of a campaign designer from gaming the system for their own gain. Thus, it can be desirable that the digital tokens (e.g., NFTs, etc.) be generated deterministically, assigned to specific machines in a deterministic fashion, vended in a deterministic fashion, or otherwise managed in a auditable manner.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A computer-implemented method of managing dispensable virtual container units, the method comprising:

storing, via at least one processor, in at least one database, state information of a set of one or more of virtual container units, wherein each virtual container unit included in the set of virtual container units is associated with at least one digital token and with a current state corresponding to a state from a set of predefined states;

presenting, via a user device, an augmented reality (AR) virtual object dispenser in an AR session containing at least a subset of the set of virtual container units;

receiving, via the user device, a first user interaction with the AR virtual object dispenser;

in response to the first user interaction, updating the state information of a first virtual container unit from a first state to a second state, wherein the first state corresponds to an undispensed state and the second state corresponds to a dispensed and unopened state;

recording the updated state information on a notarized ledger;

associating the first virtual container unit with a user account while maintaining the second state, wherein the at least one digital token associated with the first virtual container unit remains unrevealed;

enabling a transaction involving the first virtual container unit in the second state prior to revealing the at least one digital token contained therein; and maintaining provenance information of the first virtual container unit on the notarized ledger, the provenance information including the current state and at least a portion of a transaction history.

2. The method of claim 1, wherein the set of predefined states further includes a dispensed state, an opened state, and a discarded state.

3. The method of claim 1, further comprising:

receiving, via the user device or a second user device, a second user interaction with the first virtual container unit in the second state; and in response to the second user interaction, updating the state information of the first virtual container unit from the second state to a third state, wherein the third state corresponds to a dispensed state and an opened state.

4. The method of claim 3, further comprising:

revealing the at least one digital token associated with the first virtual container unit when the first virtual container unit is in the third state; and recording the revealing of the at least one digital token on the notarized ledger.

5. The method of claim 3, further comprising:

receiving, via the user device or the second user device, a third user interaction with the first virtual container unit in the third state; and in response to the third user interaction, updating the state information of the first virtual container unit from the third state to a fourth state, wherein the fourth state corresponds to a discarded state.

6. The method of claim 1, wherein the transaction involving the first virtual container unit in the second state while the at least one digital token remains unrevealed comprises at least one of: a transfer of ownership, a sale, a trade, or an auction of the first virtual container unit.

7. The method of claim 1, wherein each virtual container unit is visually presented in the AR session according to presentation parameters associated with its current state.

8. The method of claim 7, wherein the presentation parameters include at least one of: a shape, a color, a size, a texture, a logo, a brand, or an animation that changes based on the current state of the virtual container unit.

9. The method of claim 1, wherein the at least one digital token associated with the first virtual container unit is created after the first virtual container unit is dispensed from the AR virtual object dispenser.

10. The method of claim 1, wherein the at least one digital token associated with the first virtual container unit is created before the first virtual container unit is dispensed from the AR virtual object dispenser.

11. The method of claim 1, further comprising:

tracking at least one aging parameter of the AR virtual object dispenser based on user interaction frequency; and modifying presentation parameters of at least one virtual container unit within the AR virtual object dispenser based on the aging parameters.

12. The method of claim 1, wherein the notarized ledger comprises at least one of: a blockchain, a distributed ledger, a private ledger, or a public ledger.

13. The method of claim 1, wherein the first virtual container unit is represented as a non-fungible token (NFT)

on the notarized ledger, and wherein the at least one digital token contained within the first virtual container unit is a separate NFT.

14. The method of claim 1, further comprising invoking a smart contract interface associated with the at least one digital token.

15. The method of claim 1, wherein associating the first virtual container unit with the user account comprises:

recording ownership information on the notarized ledger, the ownership information including at least one of: a user account identifier, a virtual container unit identifier, a timestamp, a location of the user device when the first virtual container unit was dispensed, or an identifier of the AR virtual object dispenser.

16. The method of claim 1, further comprising:

determining a sequence identifier for each virtual container unit in the set of virtual container units; and dispensing the virtual container units from the AR virtual object dispenser according to a predetermined sequence based on the sequence identifiers.

17. The method of claim 1, further comprising:

associating the first virtual container unit with auditable information that verifies the first virtual container unit was properly obtained from the AR virtual object dispenser, wherein the auditable information includes at least one of: a timestamp, a physical location, a device context, a user context, or extrinsic device data related to the user device.

18. The method of claim 1, wherein the transaction involving the first virtual container unit in the second state is recorded on the notarized ledger while maintaining the second state, such that subsequent owners receive the first virtual container unit in the unopened state.

19. The method of claim 1, wherein the first virtual container unit is visually presented in the AR session as a three-dimensional object having at least one of: a spherical shape, a rectangular shape, a capsule shape, a box shape, or a custom shape associated with a brand.

20. The method of claim 1, further comprising generating the at least one digital token deterministically according to a rarity.

*  *  *  *  *